US007156298B2

(12) United States Patent
McCracken et al.

(10) Patent No.: US 7,156,298 B2
(45) Date of Patent: *Jan. 2, 2007

(54) CASH DISPENSING AUTOMATED BANKING MACHINE WITH ADJUSTABLE CHEST HINGE METHOD

(75) Inventors: Richard W. McCracken, Canton, OH (US); Scott A. Mercer, Hanoverton, OH (US); Mark Bartolomeo, Pittsburgh, PA (US); Howard Antram, Alliance, OH (US)

(73) Assignee: Diebold Self-Service Systems, division of Diebold, Incorporated, North Canton, OH (US)

(*) Notice: Subject to any disclaimer, the term of this patent is extended or adjusted under 35 U.S.C. 154(b) by 158 days.

This patent is subject to a terminal disclaimer.

(21) Appl. No.: 10/984,691

(22) Filed: Nov. 9, 2004

(65) Prior Publication Data

US 2005/0127159 A1 Jun. 16, 2005

Related U.S. Application Data

(60) Provisional application No. 60/519,079, filed on Nov. 10, 2003.

(51) Int. Cl.
*G06F 19/00* (2006.01)

(52) U.S. Cl. ........................ 235/379; 902/8; 109/59 R

(58) Field of Classification Search ............. 109/59 R, 109/58; 235/381, 459; 902/8, 9, 14
See application file for complete search history.

(56) References Cited

U.S. PATENT DOCUMENTS 6,089,168 A * 7/2000 Dunlap et al. ............ 109/59 R
7,000,830 B1 * 2/2006 Mercer et al. .............. 235/379
7,063,254 B1 * 6/2006 Tula et al. .................. 235/379

* cited by examiner

*Primary Examiner*—Seung Ho Lee
(74) *Attorney, Agent, or Firm*—Christopher L. Parmelee; Ralph E. Jocke; Walker & Jocke LPA

(57) ABSTRACT

A secure enclosure for an automated banking machine includes a safe chest portion and a moveable door. The door has mounted thereon a locking bolt work mechanism which is operable to secure the door in a closed position. The door is mounted to the chest with the use of hinge assemblies having respective hinge pins. The hinge assemblies enable the door to be selectively adjusted in up-down and right-left directions. The door can be moved in the up-down direction via an adjustable set screw operative to move vertically relative to a hinge pin. The door can be moved in the right-left direction via adjustable set screws operative to engage and pivot the hinge pin. Thus, the door can be aligned with the chest opening.

27 Claims, 20 Drawing Sheets

134

196

110

110
120
122

114
112

118
116

90

108

184
50
188
186

100
102
104
106
128
132
130

128
132

128
130

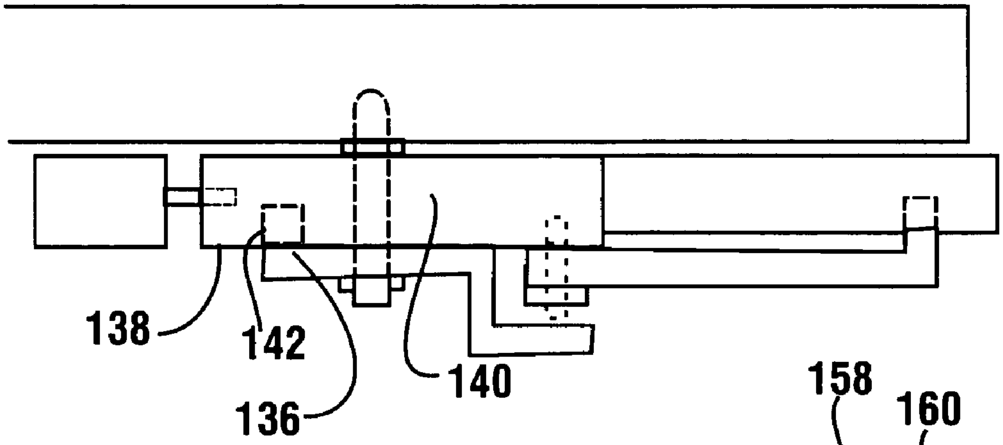
FIG. 22
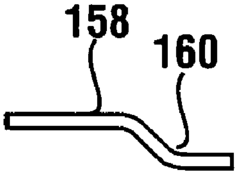
FIG. 26
FIG. 23
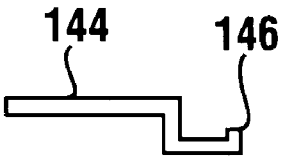
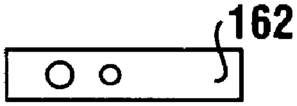
FIG. 27
FIG. 24
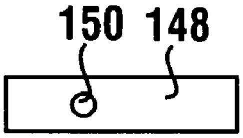
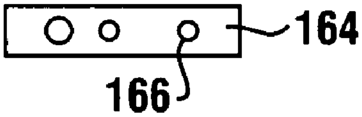
FIG. 28
FIG. 25
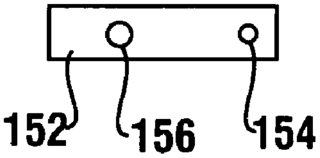
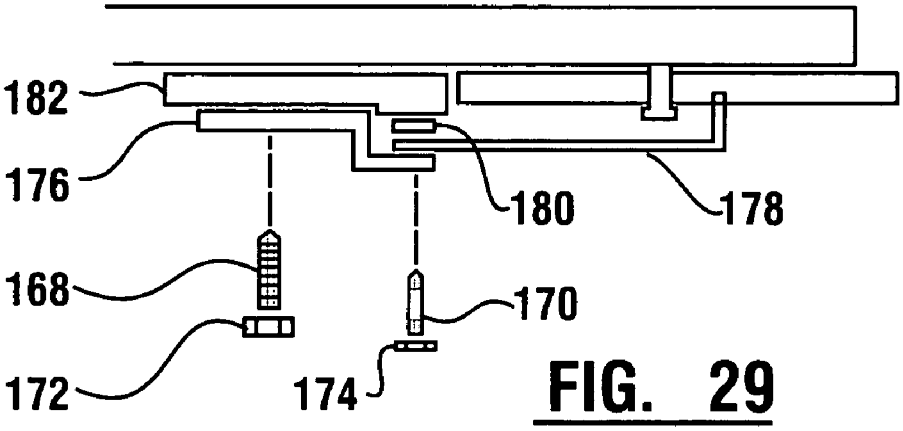
FIG. 29

CASH DISPENSING AUTOMATED BANKING MACHINE WITH ADJUSTABLE CHEST HINGE METHOD

CROSS REFERENCE TO RELATED APPLICATIONS

This application claims the benefit of U.S. Provisional Application No. 60/519,079 filed Nov. 10, 2003

TECHNICAL FIELD

This invention relates to automated banking machines. Specifically this invention relates to a secure enclosure for an automated banking machine, which enclosure includes a secure door, and its method of assembly.

BACKGROUND ART

Automated banking machines are known in the prior art. Popular automated banking machines often used by consumers are automated teller machines (ATMs). ATMs are increasingly used by consumers to conduct banking transactions. Common banking transactions conducted by consumers at ATMs include deposits, withdrawals, account transfers, and balance inquiries.

Most ATMs include a secure enclosure. The secure enclosure is used to hold currency and other valuable items inside the machine. Deposits made by customers into an ATM are also preferably held within a secure enclosure until they can be removed by authorized personnel. The secure enclosure also preferably houses portions of the mechanisms used for receiving deposits and dispensing currency. The secure enclosure also preferably houses electronic components of the ATM which may be subject to attack by someone attempting to compromise the security of the ATM or the electronic communications network in which it is operated.

Secure enclosures used in automated banking machines are specifically made for the type of machine in which they are used. Such enclosures, unlike most common types of safes or vaults, include multiple openings through the walls of the enclosure. These openings are precisely positioned. Such precise positioning is necessary to cooperate with the components of the ATM outside the enclosure. For example, an opening through the secure enclosure is required to enable a currency dispenser mechanism within the secure enclosure to pass currency notes to a delivery mechanism outside the enclosure that delivers the notes to the customer. Likewise a precise opening is required to pass deposit envelopes and other valuables from the deposit accepting opening and mechanism outside of the secure enclosure to the depository mechanism inside the secure enclosure. Similarly, wiring harnesses and other connectors for the electronic and alarm components within the enclosure extend through enclosure openings which must be accurately positioned to enable connection to other wiring or devices in the ATM that are outside the enclosure.

There are many types of ATMs. ATMs can be configured as lobby units, which are made to be used within the confines of a building. Other ATMs are made for "through the wall" installation which enables a user outside of a building to use the machine. ATMs vary in physical size due to a number of factors. ATMs that provide a wide variety of functions, such as passbook printing, ticket or stamp dispensing, check cashing and other functions must necessarily be physically larger than machines that do not provide such functions. Such multifunction machines generally have secure enclosures that are much larger than machines that have fewer capabilities. ATMs that provide a single function, such as dispensing cash, often require a much smaller secure enclosure.

Secure enclosures for automated banking machines include, in connection with a moveable door, a locking bolt work apparatus. The locking bolt work is generally in a secure, locking condition when the door is closed. When authorized personnel act to open the door of the secure enclosure, such as by inputting a proper combination to a lock, the locking bolt work is moveable to a second unsecured condition. In the second condition of the bolt work, the door is enabled to be opened so that components within the secure enclosure can be accessed.

Due to the incentive for burglars to attack ATMs, the bolt work and other locking mechanisms used in connection with the moveable doors of secure enclosures preferably provide a high degree of resistance to attack. However, providing enhanced security also often comes with a high degree of complexity. This increases the cost of the automated banking machine. Complex mechanisms can also make it more difficult for authorized personnel to gain access to the secure enclosure.

Further, the manufacture of a secure enclosure for an automated banking machine has traditionally required that a great deal of attention be paid to the hinges which are used to attach the moveable door to the secure enclosure. Hinges are often a site for attack by burglars. To achieve strong hinges, care has been exercised to assure that the hinges are securely attached to both the door and enclosure. Because the hinges are often two or more separate assemblies and must be permanently fixed in place, often by welding, it is common to connect the hinge assemblies first to either the door or enclosure, and then to the other component. This can be burdensome from an assembly standpoint.

When components of the hinge assemblies are attached to the door and enclosure in separate operations it is not uncommon to encounter situations where the hinges are slightly misaligned. In such circumstances it may not be possible to mount the door on the enclosure without considerable rework. Even if the door can be mounted on the hinges, it may not be properly positioned to enable closing the opening of the enclosure. Again, in such circumstances costly rework is required to make the secure enclosure suitable for use in an automated banking machine.

DISCLOSURE OF INVENTION

Thus, there exists a need for a secure enclosure and a method of manufacturing a secure enclosure for an automated banking machine that is more reliable and economical.

There also exists a need for a locking bolt work apparatus for a door of an automated banking machine that provides enhanced security, but which is also economical with low complexity and which can be quickly opened by authorized personnel. There further exists the need for a method of assembling the locking bolt work apparatus to a secure enclosure that can be readily accomplished in a more efficient manner.

There also exists a need for a system and method for mounting a door on a secure enclosure of an automated banking machine that more readily accomplished. There further exists a need for a system and method for mounting a door on a secure enclosure of an automated banking machine in which a hinge does not pose a weak point that is vulnerable to attack by burglars. There further exists a need for a system and method for mounting a door on a secure enclosure of an automated banking machine that can be done despite misalignment of hinges which support the door.

It is an object of an exemplary form of the present invention to provide a secure enclosure for an automated banking machine.

It is a further object of an exemplary form of the present invention to provide a secure enclosure for an automated banking machine that is more readily accomplished.

It is a further object of an exemplary form of the present invention to provide a secure enclosure for an automated banking machine that is more accurate and reliable.

It is a further object of an exemplary form of the present invention to provide a secure enclosure for an automated banking machine that can provide enhanced security.

It is a further object of an exemplary form of the present invention to provide a secure enclosure for an automated banking machine that includes a more secure bolt work apparatus.

It is a further object of an exemplary form of the present invention to provide a secure enclosure for an automated banking machine that includes a bolt work apparatus that may be more readily installed in the secure enclosure.

It is a further object of the present invention to provide a secure enclosure for an automated banking machine that includes a moveable door mounted on multiple hinges that enable the door to be properly mounted and positioned despite misalignment of the hinges.

It is a further object of the present invention to provide a secure enclosure for an automated banking machine in which the hinges, which are used to mount the moveable door on the enclosure, are less vulnerable to attack.

The disclosures of U.S. Provisional Application Nos. 60/453,647 filed Mar. 10, 2003 and 60/453,667 filed Mar. 10, 2003 and 60/494,614 filed Aug. 11, 2003 are incorporated herein by reference.

Further objects of exemplary forms of the present invention will be made apparent in the following Best Mode for Carrying Out Invention and the appended claims.

The foregoing objects are accomplished in an exemplary embodiment of the present invention by a secure enclosure for an automated banking machine that includes a bolt work apparatus. In the exemplary embodiment of the invention the automated banking machine is an ATM. Precisely positioned openings extend through the secure enclosure. The openings enable cooperation between devices and mechanisms inside and outside of the enclosure, which enables the conducting of banking transactions.

The secure enclosure comprises a safe chest including panels and a moveable door. The chest includes a front panel. The front panel is connected to a hinge side panel and a parallel spaced striker or lock side panel. The striker side panel further includes a plurality of vertically aligned apertures therethrough. The chest further includes a top panel and a parallel, spaced bottom panel. An opening to the chest extends on a side opposite the front panel when the door is in an open position. Each of the panels preferably includes precisely positioned access openings for cooperating with the components which make up the ATM.

The door and secure chest have corresponding hinge portions. The construction of the hinge assemblies enables the door to be mounted on the chest despite minor misalignment of the hinge pins. Components of the hinge assemblies are adjustable to correct alignment of the door relative to the chest. The hinge assembly components enable the door to be adjusted in both up-down and right-left directions. Vertical adjustment of the door can be accomplished by adjusting an up-down set screw in the door hinge portion to move the door in an up-down direction. Horizontal adjustment of the door can be accomplished by adjusting right-left set screws in the chest hinge portion to pivot the hinge pin and move the door in a right-left direction.

The door has mounted thereon a locking bolt work apparatus or mechanism. The locking bolt work mechanism is moveable responsive to the condition of a lock, between a secure and an open condition. The bolt work mechanism includes a moveable locking bolt with a plurality of locking bolt projections. In the secure condition of the locking bolt, the locking bolt projections extend in the apertures in the striker side panel of the chest. In the open condition the locking bolt projections are retracted from the apertures enabling movement of the door to the open position.

The locking bolt is moveable in response to an actuating mechanism. The actuating mechanism includes a drive cam. The drive cam is operative to be secured by the lock and is operative to be moved by a door handle when the lock is in an open condition. The drive cam is connected by a generally vertically extending long link to an idler cam. The drive cam and the idler cam are each rotatably moveable and positioned adjacent to a respective vertical end of the locking bolt. The locking bolt is connected to the drive cam by a generally horizontally extending short link. The locking bolt is also connected to the idler cam by another generally horizontally extending short link.

In the secure condition of the locking bolt, the drive cam and the idler cam are in adjacent abutting position with the locking bolt. In addition, an alignment device is operative to rotatably align the drive cam with the lock to enable locking of the drive cam. The alignment device can act as a stop to prevent further movement of the drive cam in a first rotational direction.

In response to unlocking the lock by authorized personnel, the drive cam of the actuating mechanism is enabled to be rotated. The drive cam can be rotated to cause rotation of the idler cam through the long link. The drive cam and the idler cam can be rotated together in a direction that results in the short links moving the locking bolt in an inward unlocking direction. The locking bolt is enabled to move sufficiently to disengage from the apertures in the striker side panel of the chest which enables opening of the door. Thus, the locking bolt work mechanism when arranged with a secure chest door enables the drive cam to be rotated in a first direction and a second direction to move the locking bolt relative to the door between an extended door-secured position and a retracted door-open position, respectively.

BRIEF DESCRIPTION OF DRAWINGS

FIG. 22 shows a retainer portion resting in a groove of a cam.

FIG. 23 is a side view of a retainer including a hook portion.

FIG. 24 is a bottom view of a retainer with a passage.

FIG. 25 is a bottom view of a retainer with plural passages.

FIG. 26 is a side view of a retainer including a curved portion.

FIG. 27 is a bottom view of a retainer applicable with an idler cam.

FIG. 28 is a bottom view of a retainer similar to the retainer of FIG. 27 but additionally including an aperture for a link's shaft.

FIG. 29 is a top view of a long link and a short link arrangement.

BEST MODE FOR CARRYING OUT INVENTION

Figure 1:
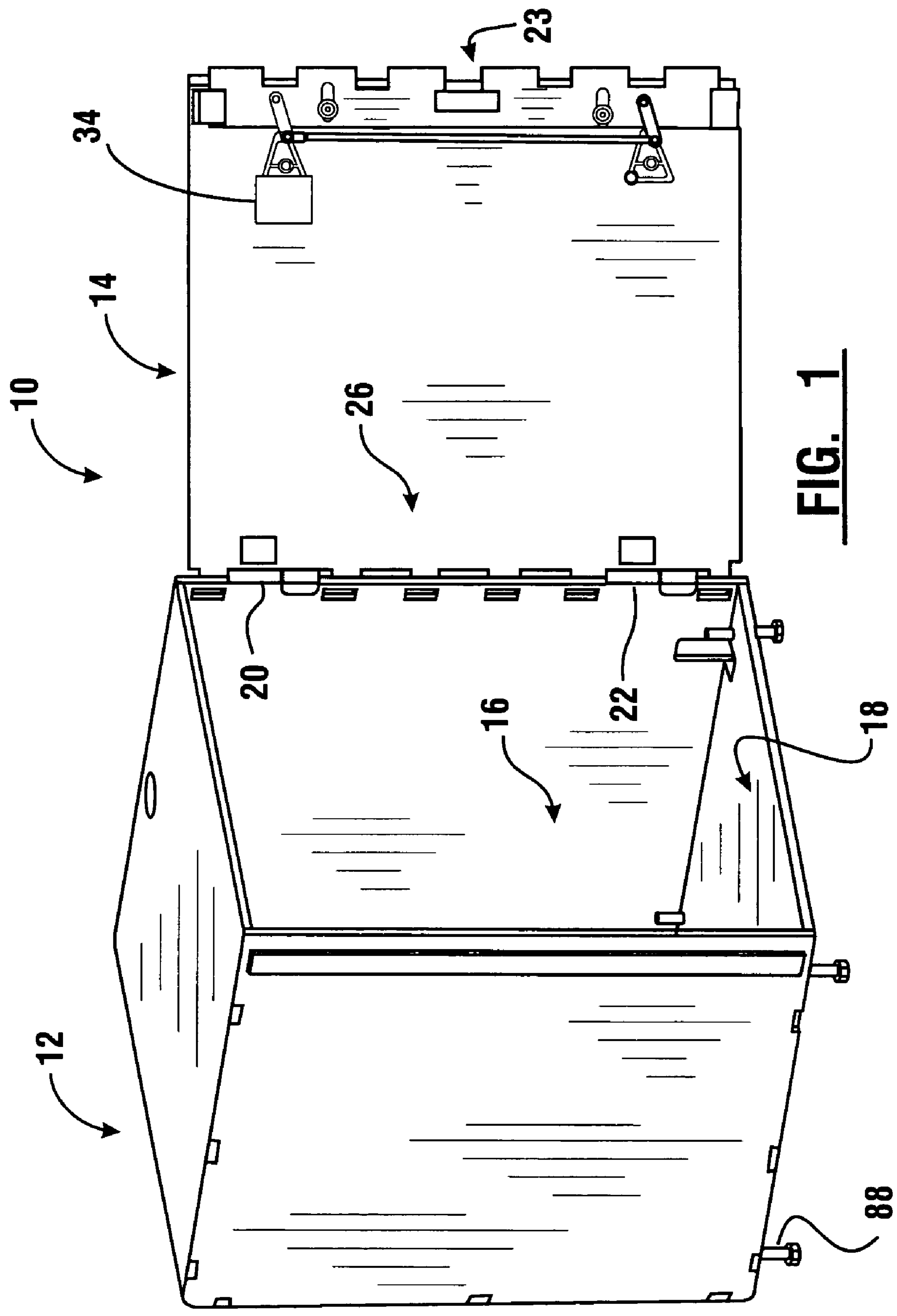
FIG. 1 is an isometric view of a secure enclosure of the present invention for an automated banking machine, with a door thereof in an open condition.

Referring now to the drawings and particularly to FIG. 1, there is shown therein a secure enclosure arrangement for an automated banking machine of an exemplary embodiment of the present invention, generally indicated 10. It should be understood that the secure enclosure can be part of a larger automated banking machine, such as an ATM or similar apparatus.

The secure enclosure 10 can include a chest portion and a door. An example of an arrangement of a chest portion and a door for a secure enclosure of an automated banking machine and the assembly thereof may be found in U.S. Pat. Nos. 5,970,890 and 6,089,168, the disclosure of which is incorporated herein by reference in its entirety.

An example of an automated banking machine including a user interface with an opening through which the machine can receive a stack of sheets including currency notes and checks may be found in U.S. Pat. No. 6,749,111, the disclosure of which is incorporated herein by reference in its entirety.

A further example of an automated banking machine including an apparatus and method for accepting items for deposit into a cash dispensing automated banking machine may be found in U.S. patent application Ser. No. 10/796,775 filed Mar. 9, 2004, the disclosure of which is incorporated herein by reference in its entirety.

An example of an automated banking machine including a user interface, transaction function devices, and a secure safe chest may be found in U.S. patent application Ser. No. 10/797,930 filed Mar. 9, 2004, the disclosure of which is incorporated herein by reference in its entirety.

An example of a chest in an automated banking machine housing that can accept deposits, such as deposit envelopes, currency notes, checks, and other valuables via a deposit accepting opening to a depository or storage area inside the chest may be found in U.S. patent application Ser. No. 10/688,619 filed Oct. 17, 2003, the disclosure of which is incorporated herein by reference in its entirety.

The secure enclosure 10 in FIG. 1 includes a generally rectangular chest portion 12 and a moveable door 14. The chest portion 12 bounds an interior area 16 which has an opening 18 at a rear side of the chest. Door 14 is sized for closing opening 18. The chest door 14 is movably mounted to the chest 12. Door 14 is removably attached to chest 12 by an upper hinge assembly 20 and a lower hinge assembly 22.

Door 14 has mounted thereon a locking bolt mechanism 23. Door 14 further includes a dead bolt portion 26. The locking bolt mechanism 23 and the dead bolt portion 26 are operative to secure the door in position closing opening 18.

Figure 2:
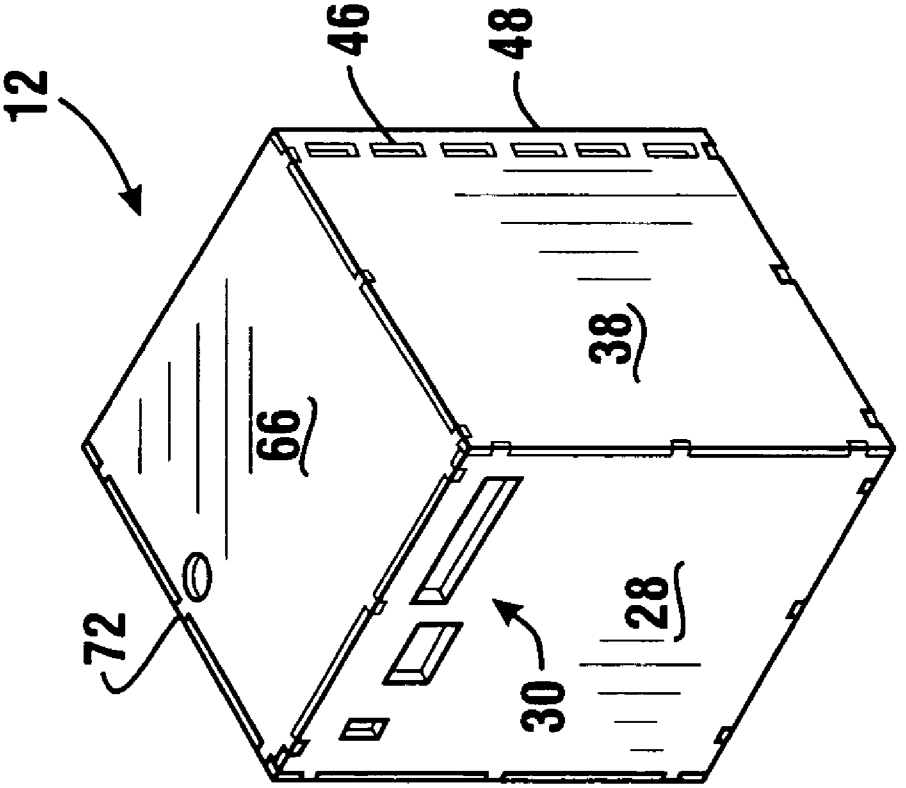
FIG. 2 is an isometric front view of the secure enclosure shown in FIG. 1.
Figure 3:
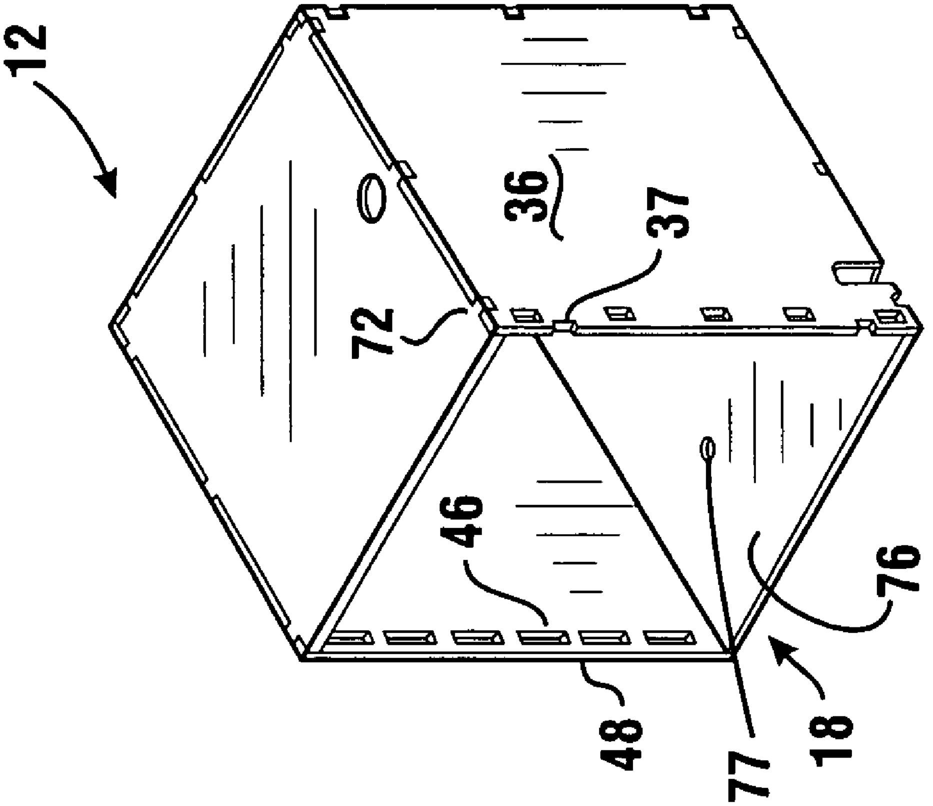
FIG. 3 is an isometric rear view of the secure enclosure shown without the door.

As shown in FIGS. 2 and 3 the chest portion of the secure enclosure includes a front panel 28. Front panel 28, in the embodiment shown, faces the customer side of the ATM. The front panel 28 includes openings 30. The openings 30 are sized for cooperating with mechanisms in the ATM. These mechanisms include, for example, a mechanism that delivers cash or other valuable items to a customer. For example, a supply of cash may be maintained within the secure enclosure in the ATM, and a picker mechanism may be provided for delivering the currency bills or notes that have been properly requested by a customer. The bills are delivered out of the secure enclosure through one of the openings 30 to a mechanism in the ATM which delivers the money to the customer.

Other openings in the front panel 28 are used in connection with a mechanism that receives deposits from customers. Customers may insert deposits through an opening in a fascia of the ATM, and a mechanism delivers the deposit envelopes through an opening in the front panel 28 to another mechanism within the chest portion. Generally the mechanism places the deposit envelopes in a secure removable container within the enclosure.

The chest portion 12 further includes a hinge side panel 36 and a striker or lock side panel 38. The hinge side and striker side panels extend generally parallel from front panel 28. Striker side panel 38 includes a plurality of vertically aligned locking bolt apertures 46. Locking bolt apertures 46 preferably extend through the striker side panel at a position that is somewhat disposed inwardly from a front surface 48 of the panel which bounds the opening 18. Locking bolt apertures 46 are sized for accepting therein projections on a locking bolt in a manner later explained.

Chest portion 12 further includes a top panel 66. Top panel 66 includes an opening 72 for providing access between the components within the secure enclosure and other components of the ATM of which the enclosure is a part. Opening 72 in panel 66 provides access for electronic cabling which communicates with the components inside the chest. Such cabling may be used to transmit signals that control operation of the cash dispensing and depository mechanisms. In addition, wiring harnesses and other cabling provide connections to alarm devices and other equipment that are housed within the secure enclosure.

Chest portion 12 further includes a bottom panel 76. Bottom panel 76 includes access openings 77 for purposes of providing connections to the items within the secure chest. In addition, bottom panel 76 may include plural foot mounting openings (e.g., four openings). Foot mounting openings can accept adjustable feet 88 as shown in FIG. 1. Adjustable feet 88 may be adjusted vertically for purposes of leveling and positioning the ATM of which the secure enclosure 10 is a part.

Figure 7:
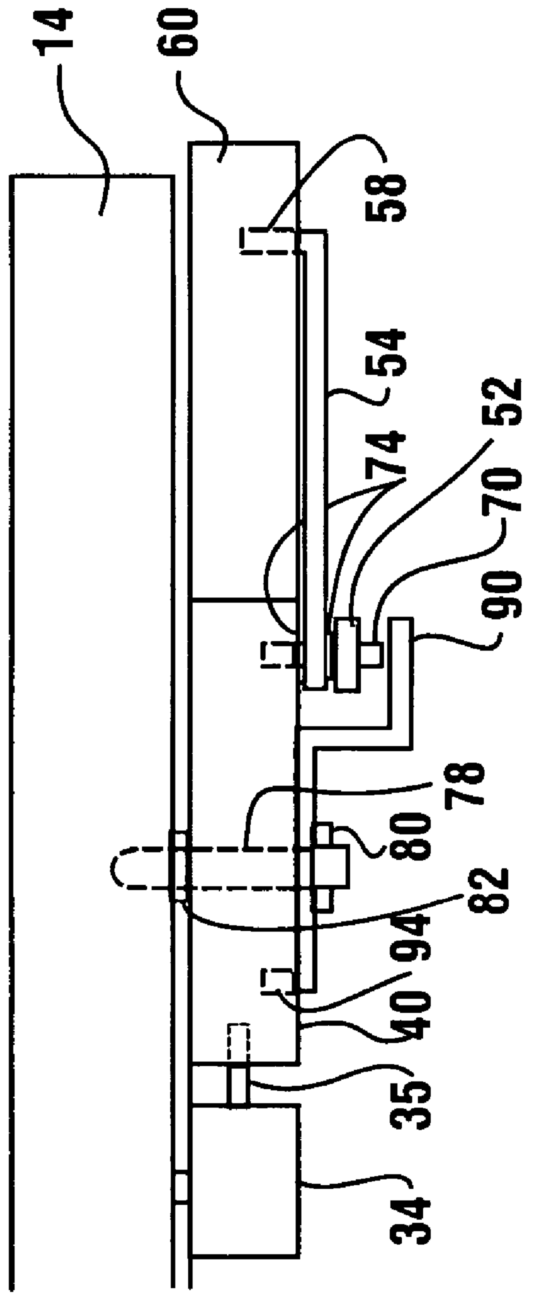
FIG. 7 is a top view of a drive cam arrangement.

Door 14 also has a lock 34 mounted thereto. Lock 34 includes a lock bolt member 35 as shown in FIG. 7. Lock bolt member 35 is a member that is moveable between extended and retracted positions. Lock bolt member 35 extends from the case of lock 34 when the lock 34 is in the closed condition. Lock bolt member 35 is retracted into the case of lock 34 when the lock is in the open condition. The lock is operative to be opened from outside of the door 14.

Figure 4:
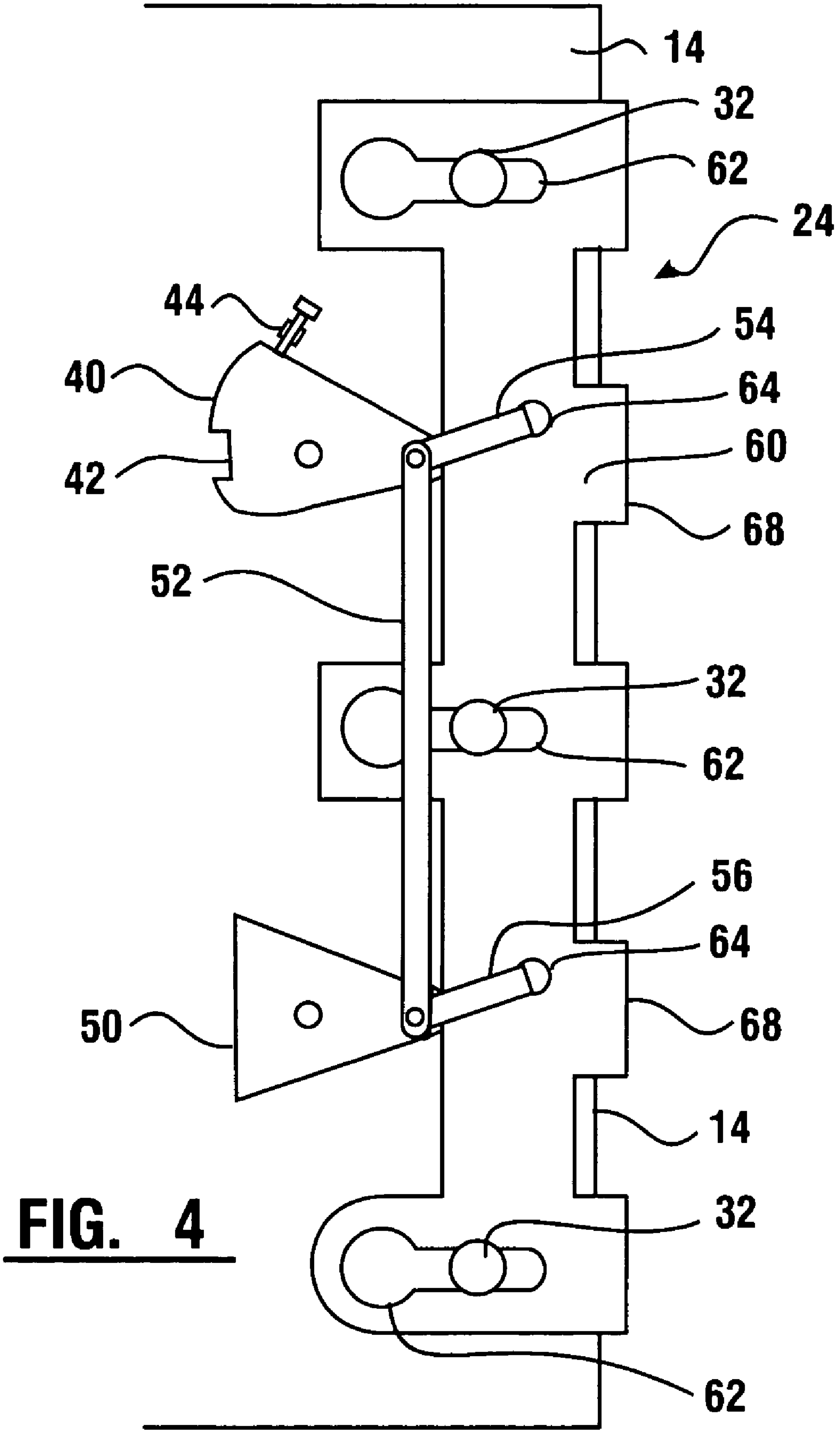
FIG. 4 is a side view of an exemplary embodiment of a locking bolt work apparatus of the present invention, in a secured position.
Figures 10, 11, 12, 13, 14, 15, 16, 17, 18, 19, 20, 21:
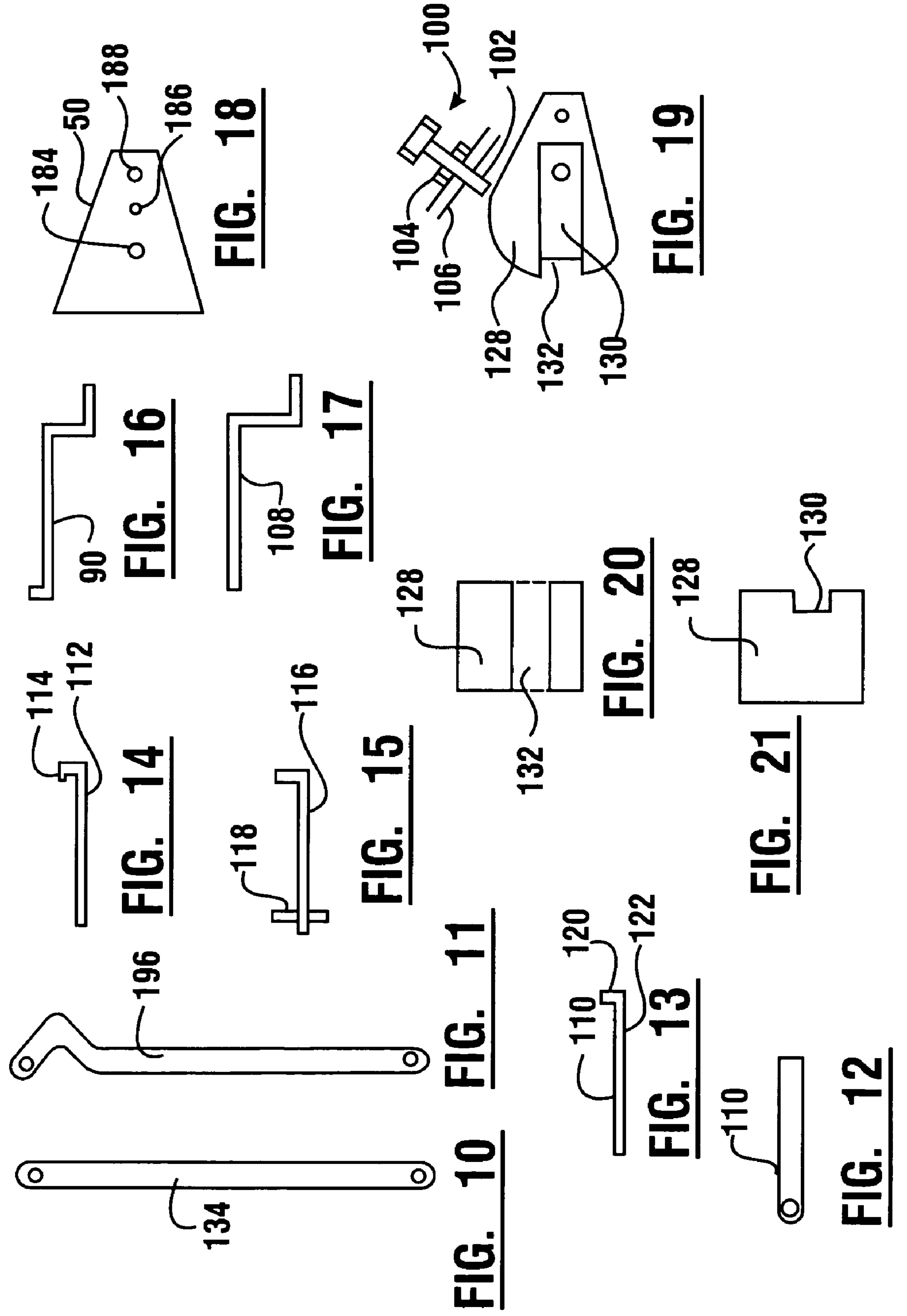
FIG. 10 is a side view of a long link.
FIG. 11 is another side view of a long link.
FIG. 12 is a top view of a short link.
FIG. 13 is a side view of the short link of FIG. 12.
FIG. 14 is a side view of a short link having a hook portion at one end.
FIG. 15 is a side view of a short link combined with a pin.
FIG. 16 is a side view of a retainer.
FIG. 17 is a side view of another retainer.
FIG. 18 is a top view of an idler cam.
FIG. 19 is a top view of a drive cam having a cut out and a groove.
FIG. 20 is a front view of the cam of FIG. 19 taken along the cut out.
FIG. 21 is a cut away front view of the cam of FIG. 19 taken along the groove.

An exemplary embodiment of a locking bolt work apparatus 24 is shown in FIG. 4. The locking bolt work apparatus 24 includes a locking linkage arrangement. A drive cam 40 is connected to an idler cam 50 by a connector (e.g., cam link or lever or long link or L-Link) 52. Further embodiments of cam links 134, 196 are shown in FIGS. 10 and 11. The curved portion of cam link 196 may be used to avoid contacting the cam link with other structure associated within the enclosure. The cam links may have a passage therethrough at each end. The drive cam may be driven by authorized personnel using a door handle located on the exterior of the door. It should be appreciated that the long link can be arranged to enable the idler cam 50 to rotate together in coordinated relation with the drive cam 40.

The drive cam 40 is connected to a locking bolt (e.g., lock bar) 60 by a link (e.g., bolt link or lever or upper short link or S-Link) 54. Similarly, the idler cam 50 is connected to the elongated locking bolt 60 by a link (e.g., bolt link or lever or lower short link or S-Link) 56. The bolt links 54, 56 are generally of the same length. Each of the bolt links 54, 56 may also be used with either the drive cam or the idler cam. The short links, 54, 56 are also generally shorter than the long cam link 52. Further embodiments of bolt links are shown in FIGS. 12–15. The bolt links may have a passage therethrough at one end. A bolt link's passage is able to be aligned with a passage of the cam link for operative connection therewith. FIG. 12 is a top view of a bolt link 110. FIG. 13 is a side view of the bolt link 110 of FIG. 12. FIG. 13 also shows the bolt link 110 having an end portion 120. The end portion 120 is typically shorter than an elongated portion 122 of the bolt link and also comprises a part which extends in a direction substantially perpendicular to the elongated portion. FIGS. 14–15 are also side views of respective bolt links. FIG. 14 shows a bolt link 112 having a hook 114 at an end portion thereof to permit securement to a locking bolt 60. FIG. 15 shows a bolt link 116 having a pin 118 attached or integral thereto. FIGS. 14 and 15 are explained in more detail below.

Figure 6:
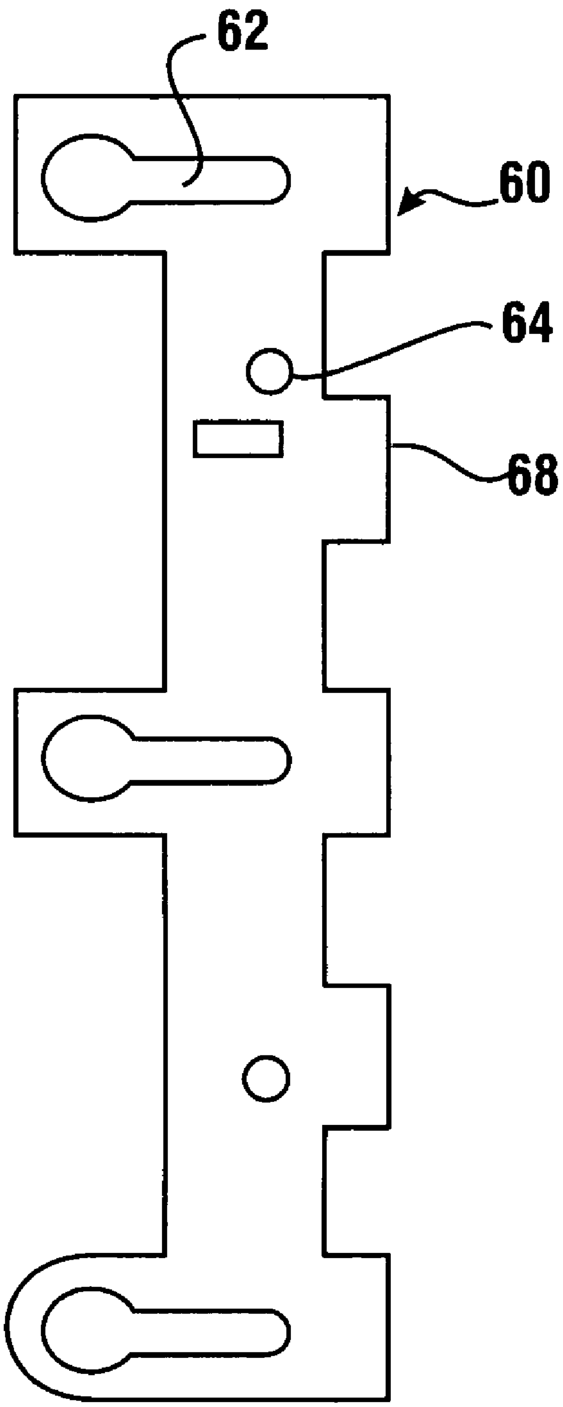
FIG. 6 is a side view of a locking bolt.

The locking bolt 60, which is separately shown in FIG. 6, has openings or slots 62 to accept studs 32 therein. The studs may be directly attached to the door 14, such as by welding. Each of the studs comprises a head and a narrower neck in an axial direction. The slots 62 have a wide or head portion enabling passage of a stud head therethrough, and a narrower or neck portion preventing passage of the stud head therethrough. The stud heads enable the locking bolt 60 to be secured to the studs. A stud, when the stud head is positioned overlaying a neck portion, prevents disengagement of the locking bolt therefrom in the axial direction of the stud. The studs are arranged and spaced in a manner to fully support the weight of the locking bolt 60. Thus, the locking bolt 60 is able to be supported by and move relative to the door 14. The openings 62 may be key shaped. The slots and studs are arranged so that after assembly of the locking bolt work mechanism the heads remain in the narrower portion during locking bolt movement. Thus, after assembly completion the locking bolt is prevented from disengagement with the door.

The studs may be fastened to the door in other fastening arrangements. For example, the studs may comprise shoulder bolts which extend into threaded bosses on the door 14. The shoulder bolts can support the locking bolt 60 and enable the locking bolt to slide in supported relation thereon. Although FIG. 4 shows an arrangement using three studs 32 it should be understood that more or fewer studs may be used in other embodiments. Further, other arrangements may use a number of studs less than the number of slots in a locking bolt. This enables the same locking bolt to be used with different arrangements of studs, and hence different doors. Further arrangements may use locking bolt slots of different shapes.

The locking bolt 60 also has passages or openings 64 to receive an end portion of the bolt links 54, 56. The end portion may comprise a finger, lip, hook, or tab (e.g., FIGS. 13–15). FIG. 13 shows a bolt link having an end portion 120 thereof to permit securement to a locking bolt 60. FIG. 14 shows a bolt link having a hook 114 at an end portion thereof to permit securement to a locking bolt 60. The locking bolt openings 64 enable the bolt links 54, 56 to be operatively engaged with the locking bolt 60. When the locking bolt work mechanism is assembled on a door, the bolt link end portions extend far enough into the locking bolt openings 64 so that they are prevented from disengaging from the locking bolt. As explained later in more detail, a keeper or retainer can be used to retain a bolt link end portion in engagement with the locking bolt. Pivoting movement of the bolt links 54, 56 relative to the locking bolt openings 64 results in sliding movement of the locking bolt 60 relative to the door.

Figure 5:
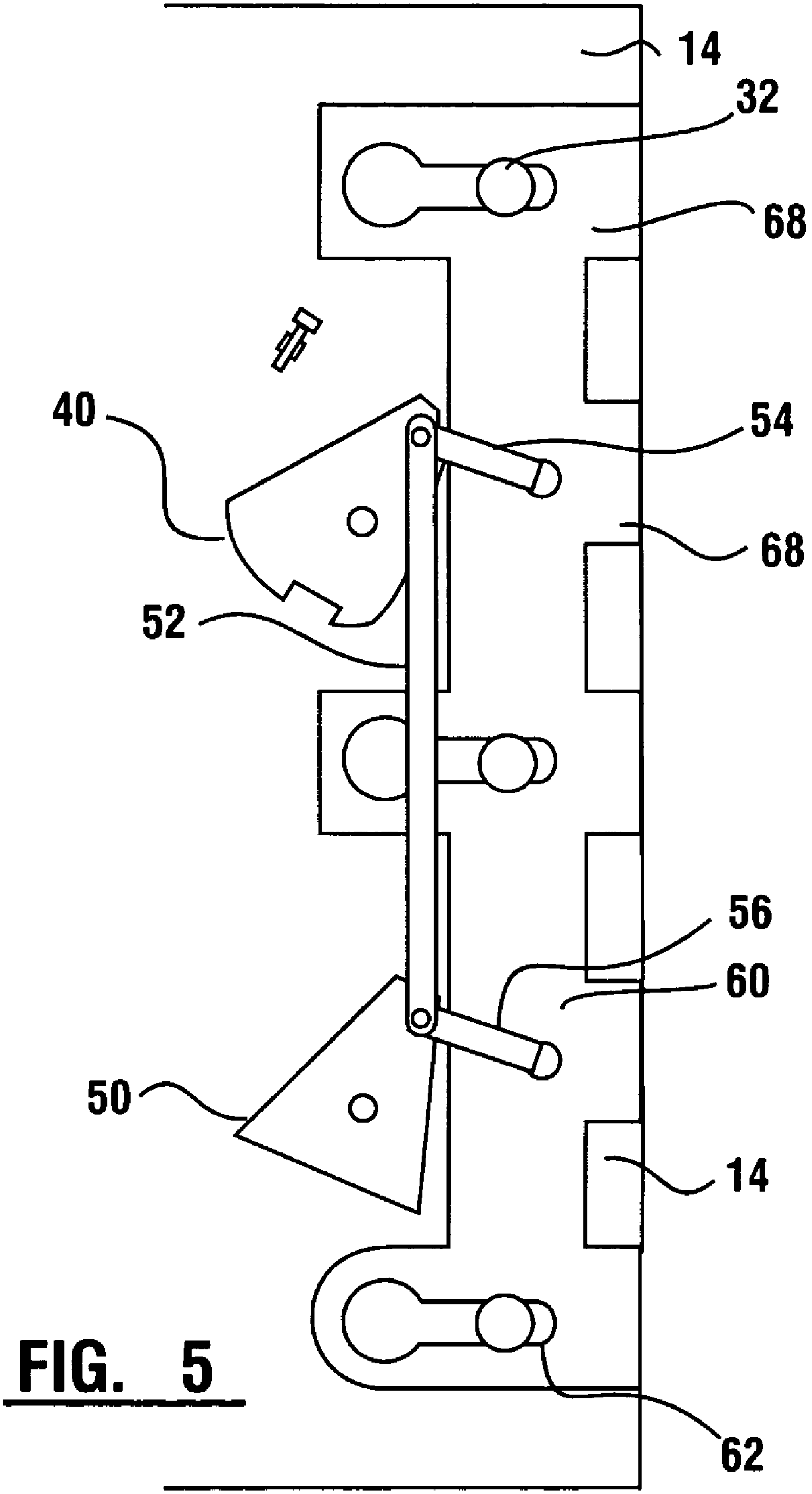
FIG. 5 is a side view of the apparatus of FIG. 4 in an unsecured position.

The operation of the locking bolt mechanism 24 is now explained with reference to FIGS. 4 and 5. The drive cam 40 includes a groove, slot, or cut out 42 in its outer periphery. Cut out 42 is sized for accepting a lock bolt member 35 therein when the lock bolt member is extended. As a result, when lock 34 is in a secure, closed condition and the lock bolt member 35 is extended into the cut out 42, locking bolt mechanism 24 is prevented from moving and is secured in the position shown in FIG. 4. In this position it should be noted that the locking bolt projections 68 (FIG. 4 shows five projections) are extended outwardly. When the door is closed, this enables the locking bolt projections 68 to be engaged in locking bolt apertures 46 in the striker side panel 38 of the chest portion.

In the secure extended position of the locking bolt 60 shown in FIG. 4, the drive cam 40 and the idler cam 50 each have a front surface that is in abutting or close adjacent relation with a back surface of locking bolt 60. This serves to resist movement of the locking bolt from its extended secure position. The abutting engagement can prevent movement of the locking bolt to the retracted position absent rotational movement of both of the drive cam and idler cam. The configurations of the drive cam and idler cam, which can include converging side walls which extend to the respective front surfaces, enable the cams to be positioned and moved in the manner shown and described.

It should also be noted that in the secure position of the locking bolt 60 shown in FIG. 4, the bolt links 54 and 56 extend in an "over center" relation relative to their respective idler cams. This over center positioning of the bolt links provides that during initial rotational movement of either idler cam in a direction that would tend to retract the locking bolt 60, the locking bolt actually moves slightly further outwardly rather than inwardly. As will be appreciated from the orientation of the components, a large rotational displacement of the idler cam 50, as well as the drive cam 40, is required before the locking bolt will retract a significant distance. This provides enhanced resistance to attack because limited movement of the cams or links will not enable significant movement of the locking bolt toward the retracted position.

As previously discussed, the locking bolt 60 can be held in the secure position shown in FIG. 4 by the engagement of the lock bolt member 35 with the cut out 42 in drive cam 40. When lock bolt member 35 is retracted, such as in responsive to an input or a lock dial receiving the correct combination, then the drive cam 40 is again free to be rotated. One or more handles may be arranged on the exterior of the door 14 to enable rotation of the drive cam. The drive cam 40 may be arranged such that a counterclockwise rotation of the drive cam moves the cam link 52 in an upward direction. This movement rotates idler cam 50 in a counterclockwise direction. The rotation of the cams moves the bolt links 54 and 56 to retract locking bolt 60 to the position shown in FIG. 5.

The retraction of the locking bolt 60 causes the locking bolt projections 68 to move out of the locking apertures 46 in the striker side panel 38. This enables the door 14 to be opened. Of course when it is desired to resecure the door, the door may be again moved to the closed position, such as by moving the drive cam in a clockwise direction. In this position the locking bolt 60 may again be extended such that projections 68 engage in the apertures 46 in the striker side panel, and the lock 34 may be changed such that lock bolt member 35 extends into the cut out 42 in the driving cam. This will again place the locking bolt mechanism 24 in a secured or locked condition.

It will be appreciated by those skilled in the art that the locking bolt mechanism, because it provides multiple places (e.g., projections 68) for engagement with an enclosure side panel, achieves more secure locking of the door in the closed position. In addition, the mounting of the locking bolt 60, as well as the nature of the forces applied to move the locking bolt, enables the locking bolt to be moved easily when the lock has been opened. This enables the locking bolt to be rapidly changed from a secure condition to an open condition by authorized personnel.

A further advantage of the locking bolt mechanism of the exemplary embodiment is that if one or more, or even all, of the bolt links are disconnected with the locking bolt in the extended position, the locking bolt cannot be moved to the retracted position. This is because the locking bolt engages the drive cam and/or the idler cam and is prevented from moving toward the retracted position until the drive cam and idler cams are properly rotated. This reduces vulnerability to a successful attack.

The assembly and arrangement of the locking bolt mechanism 24 will now be further discussed. FIG. 7 shows a cut away top view of an (upper) end portion of the assembled locking bolt mechanism of FIG. 4. The drive cam 40 may be of the type shown in FIG. 9. The locking bolt 60 in FIG. 7 is in an extended secure position. FIG. 7 also shows the operative connections of the door 14, locking bolt 60, drive cam 40, lock 34, lock bolt member 35, bolt link 54, cam link 52, and a keeper or retainer 90.

A pin or shaft 78 can be used to secure the drive shaft 40 to the door 14 and secure the retainer 90 to the drive shaft. The shaft 78 may extend through the retainer 90 and the drive cam 40 and be fastened to the door 14. The shaft may comprise a screw or bolt. A nut 80 and a washer 82 may also be used in the fastening arrangement.

Another pin or shaft 70 and washers 74 may be used to operatively connect the links 52, 54 to the drive cam 40. The pin 70 may be free to move axially or it may be attached to the cam link 52 or the bolt link 54. The pin 70 may comprise a freely movable dowel pin or bolt. The drive cam and the bolt link and the cam link are rotatable on the shaft. FIG. 15 shows an embodiment where the bolt link 116 has a shaft 118 affixed thereto. FIG. 7 also shows an end portion 58 of the bolt link 54 extended into the locking bolt 60.

Figure 9:
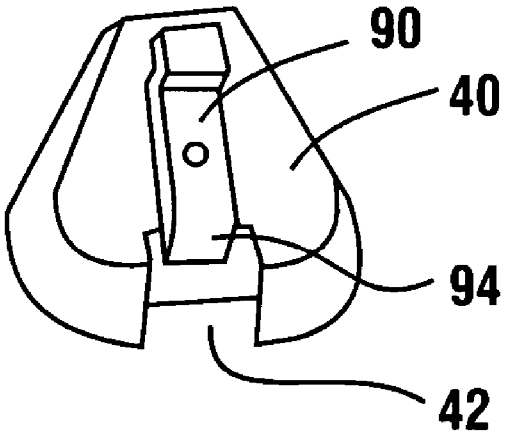
FIG. 9 is an isometric view of a drive cam and a retainer associated therewith.

As shown in more detail in FIG. 9 the retainer 90 may include a projection, lip, or tab 94 for extending into the cut out 42 in the drive cam 40. The engagement of the retainer tab 94 in the cut out 42 can be used to accurately position the retainer and/or to prevent the retainer from pivoting or rotating relative to the drive cam.

The retainer 90 can retain or keep the drive bolt link 54 from be removed from an opening 64 in the locking bolt 60. Therefore, the retainer is operative to prevent disengagement of the bolt link and locking bolt. The retainer 90 can also retain or keep the operative connection of the drive cam 40, cam link 52, and bolt link 54.

Figure 8:
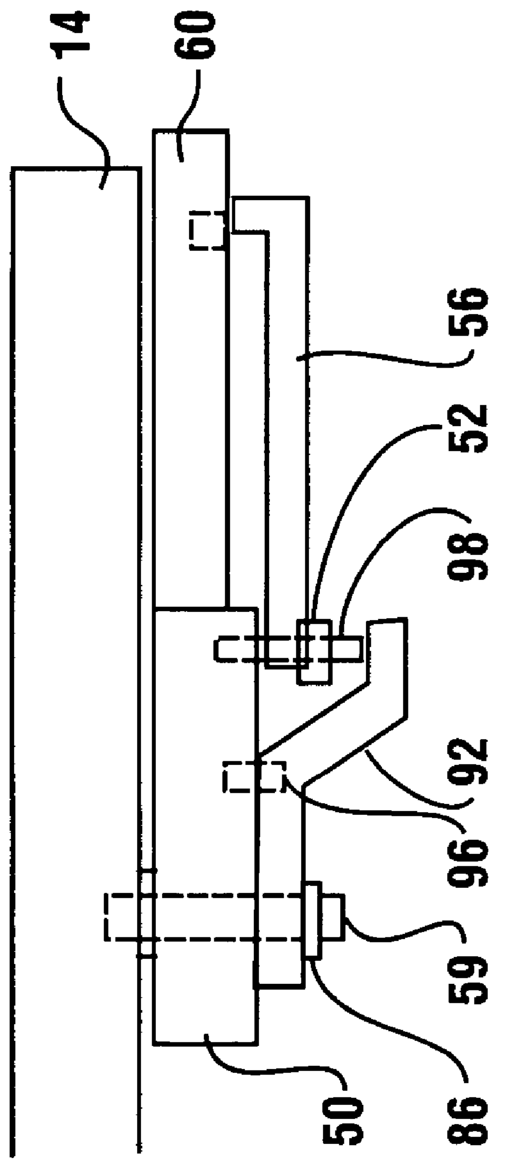
FIG. 8 is a top view of an idler cam arrangement.

FIG. 8 shows a cut away top view of an (lower) end portion of the assembled locking bolt mechanism of FIG. 4 which includes the idler cam 50. The locking bolt 60 is shown in an extended locking position. FIG. 8 also shows the operative connections of the door 14, locking bolt 60, idler cam 50, bolt link 56, cam link 52, and a keeper or retainer 92. FIG. 18 shows a top view of an idler cam 50 which can be used in the arrangement of FIG. 8. The idler cam 50 of FIG. 18 has a passage 184 therethrough and apertures 186, 188.

The keeper 92 can retain or keep the idler bolt link 56 from be removed from an opening 64 in the locking bolt 60. The keeper is operative to prevent disengagement of the bolt link and locking bolt. The keeper 92 can also keep or retain the operative connection of the idler cam 50, cam link 52, and bolt link 56.

A shaft 59 functions similar to shaft 78. A shaft 98 functions similar to shaft 70. The shaft 98 may comprise a freely movable dowel pin. The idler cam and the bolt link and the cam link are rotatable on the shaft 98.

A dowel pin 96 may be used to position and prevent the retainer or keeper 92 from pivoting or rotating relative to the idler cam 50. Of course it should be understood that a tab may be used in place of a dowel pin. For example, a tab similar to retainer tab 94 may be fastened to or integral with the keeper 92 to function to position and/or prevent rotation of the keeper 92. Likewise, the retainer 90 may be positioned with use of a dowel pin instead of the retainer tab 94. Also, a tab or dowel pin may be positioned at a predetermined location along the length of a retainer. It should also be understood that washers may be associated with the shafts and pins.

FIGS. 16–17 and 23–28 show examples of retainers. The retainer 90 of FIG. 16 may be used in the arrangement of FIG. 7.

A retainer may be engaged with a cam (i.e., drive cam or idler cam) by the use of another groove or slot in the cam. The retainer 108 of FIG. 17 may be used with a cam having a groove. FIGS. 19–21 show a drive cam 128 having a groove 130 therein in which a portion of a retainer may rest. The groove and retainer portion arrangement is operative to prevent rotation of a retainer relative to the cam. FIG. 20 shows the cut out 132 of FIG. 19. FIG. 20 is a front view of the cam of FIG. 19 taken along the cut out. FIG. 21 shows the groove 130 of FIG. 19. FIG. 21 is a view of the cam of FIG. 19 taken along the groove. The groove is aligned in each of FIGS. 19–21.

A combination of a retainer tab and a cam groove may also be used. FIG. 22 shows an embodiment having a retainer portion 136 resting in a groove 138 of a cam 140. The retainer portion 136 is also shown having a tab 142 extending in an opening of the cam 140.

FIG. 23 shows another embodiment of another retainer 144. The retainer 144 includes a hook or lip portion 146. The lip portion is able to extend toward the links to assist in retaining the shaft which operatively connects the links. The lip portion is able to extend beyond the shaft end which is adjacent to the retainer. Hence, the retainer 144 is operative to cover a shaft in a surrounding manner.

FIGS. 24–25 show bottom views of retainer embodiments. The retainer 148 in FIG. 24 is applicable with a portion of the retainer acting as a tongue in a groove of a cam. The tongue and groove arrangement can prevent angular movement of the retainer relative to the cam. The shown single passage or opening 150 in the retainer 148 is for passage of a bolt to fasten the retainer to the cam, for example a drive cam as shown in FIG. 7.

The retainer 152 shown in FIG. 25 has two openings. One opening 154 is applicable to receive a shaft which operatively connects the links, as previously discussed. The other opening 156 is applicable to receive a shaft to fasten the retainer to a cam, such as a drive cam. Other embodiments of a retainer associated with a drive cam may include an additional opening or aperture in the retainer in place of a retainer tab. The aperture is applicable to receive a dowel pin to prevent angular movement of the retainer relative to a drive cam without using a cam groove or a retainer tab. The dowel pin would also extend into a corresponding aperture in the drive cam.

FIG. 26 shows another embodiment of a retainer 158. The retainer 158 includes a curved portion 160. FIGS. 27–28 show additional bottom views of retainer embodiments applicable with an idler cam. The retainer 162 in FIG. 27 is applicable with an idler cam, such as the idler cam shown in FIG. 8. The retainer 164 in FIG. 28 is similar to the retainer of FIG. 27 but additionally has a slot or aperture 166 to receive a shaft which operatively connects the links.

FIG. 29 shows another retainer and cam arrangement. Fastening bolts 168, 170 and nuts 172, 174 maybe used in fastening a retainer 176, bolt link 178, cam link 180, and cam 182. As previously discussed, washers may also be used in the fastening arrangements. FIG. 29 also shows that a locking bolt mechanism of the invention may be arranged with a cam link intermediate of a cam and a bolt link. It should also be understood that more than two bolt links may be associated with a cam link to provide greater engagement with a locking bolt. Furthermore, a cam link may be engaged with a bolt link which isn't engaged with a cam.

FIG. 19 also shows an alignment device 100. The alignment device includes an adjustable bolt 102 and an adjusting nut 104. The alignment device includes a support 106 which is operatively connected to the door 14. The adjusting nut is adjustable to operatively position the bolt 102 so that the drive cam cut out 132 is aligned with a lock bolt member (e.g., member 35) of a lock (e.g., lock 34) to enable locking of the drive cam. The alignment device can act as a stop to accurately align a drive cam with the lock bolt member when the locking bolt 60 is in its extended locking position. The alignment device prevents further rotational movement of a drive cam. FIG. 4 shows a drive cam 40 aligned to a locking position by an alignment device 44 for locking engagement with a lock bolt member 35. FIG. 5 shows the drive cam 40 rotated to a non locking position.

Figure 30:
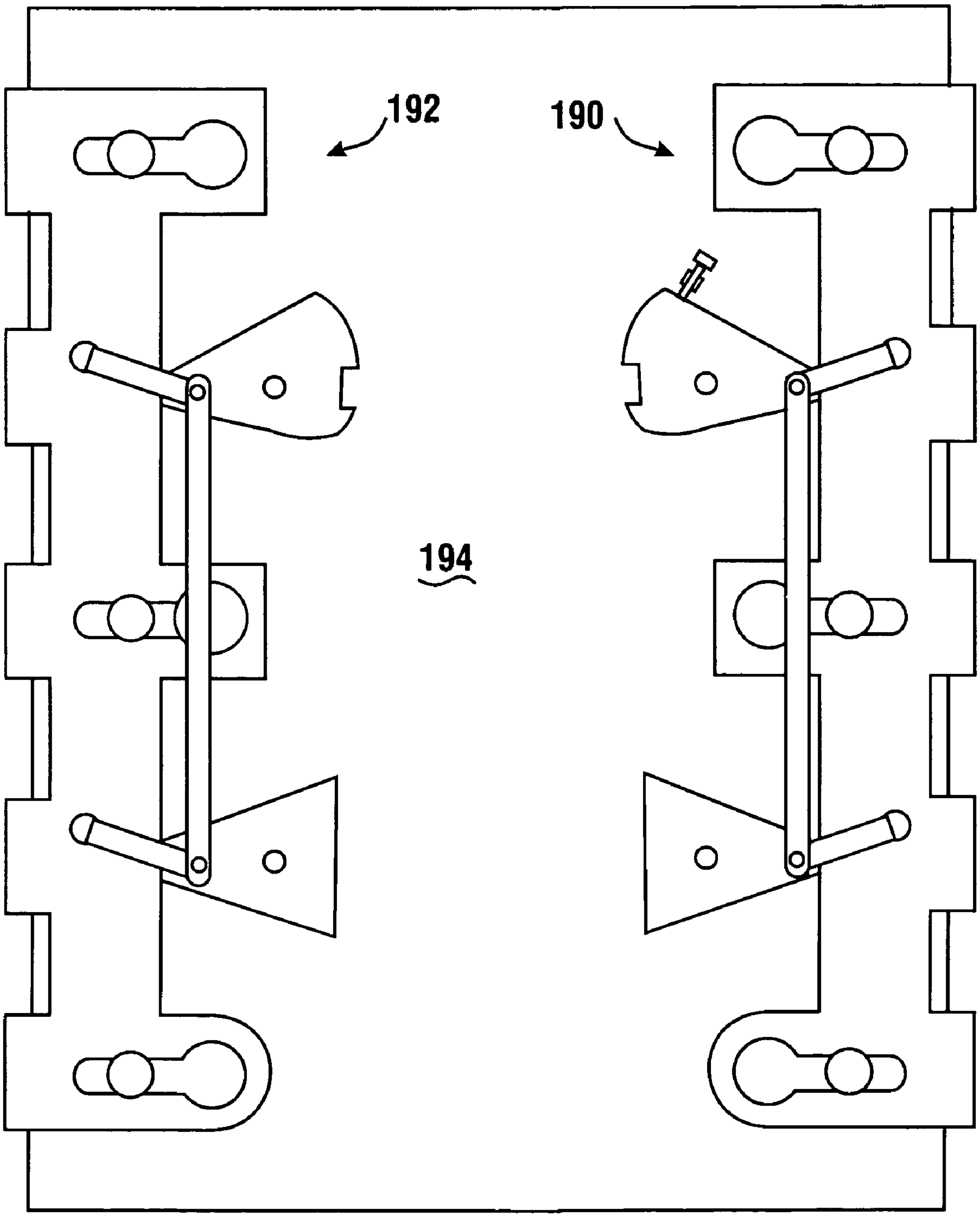
FIG. 30 shows the reversibility of the locking bolt work apparatus of the present invention.

The locking bolt work mechanism may be used with different types of automated banking machine doors. For example, an ATM may have a front load door and/or a rear load door. The invention permits the same bolt work to be used with either a front load door or a rear load door. For example, a locking bolt work mechanism of a front load door may be rotated 180 degrees for additional operation with a rear load door. FIG. 30 shows identical locking bolt work mechanisms 190, 192 positioned on both sides of the same door 194. The locking bolt work mechanisms are positioned relative to each other at a 180-degree rotation. That is, mechanism 190 can be rotated to obtain the position of mechanism 192. A locking bolt work mechanism is reversible and can be reversibly installed. FIG. 30 shows that a locking bolt work mechanism may be installed on either side of a door. Thus, a form of the locking bolt work apparatus of the invention permits plural functionality by its capability of being used with different door arrangements.

It should also be understood that the components described herein may have additional shapes. Additionally, the drive cam, idler cam, locking bolt, and links may have portions removed (e.g., cut outs) therefrom to permit reduction of material.

An assembly embodiment of the locking bolt work mechanism will now be described with reference to FIGS. 4, 7, and 8. The door 14 may include pre-drilled apertures or mounted studs for fastening the cams to the door. The locking bolt 60 is installed on the studs 32 of the door. The drive cam 40 is positioned relative to the locking bolt 60 on a fastening stud or bolt 78. A washer 82 is positioned between the drive cam and an inner face of the door. A lip of the bolt link 54 is mounted into an opening 64 of the locking bolt 60. A dowel pin 70 is extended through the cam link 52, the bolt link 54, and washers and into an aperture of the drive cam 40. A retainer 90 is positioned in abutting relationship with the drive cam 40. The tab 94 of the retainer extends into the cut out 42 of the drive cam 40. The retainer is aligned such that it covers the dowel pin. The retainer 90 is loosely fastened to the drive cam 40 with a nut 80.

The idler cam 50 is positioned relative to the locking bolt 60 on a fastening stud or bolt 59. A washer is positioned between the idler cam and the inner face of the door. A lip of the bolt link 56 is mounted into an opening 64 of the locking bolt 60. A dowel pin 98 is extended through the cam link 52, the bolt link 56, and washers and into an aperture in the idler cam 50. Another dowel pin 96, which is typically shorter than the dowel pin 98, is positioned in another aperture of the idler cam. A retainer or keeper 92 is positioned in abutting relationship with the idler cam 50. An aperture in the retainer 92 can be aligned with and receive the dowel pin 96. The keeper 92 is aligned such that it covers the dowel pin 98. The keeper 92 is loosely fastened to the idler cam 50 with a nut 86.

The drive cam 40 can be appropriately positioned relative to the lock bolt member 35 and the alignment device 44 adjusted to reflect that drive cam position. The fastening nuts 80, 86 can then be firmly tightened to secure the locking bolt work mechanism. Of course it should be understood that the method of assembly described herein is merely an example and that other assembly procedures or steps (and their order) may be used with the disclosed bolt work apparatus of the invention. For example, as previously mentioned, an assembly may include having a cam link intermediate of a cam and a bolt link.

In an exemplary embodiment the bolt work apparatus can be installed to a door using an efficient threaded fastener arrangements (e.g., two threaded bolts or studs and corresponding fastening nuts). Thus, the apparatus can provide for an efficient assembly, both in costs and time.

Figure 31:
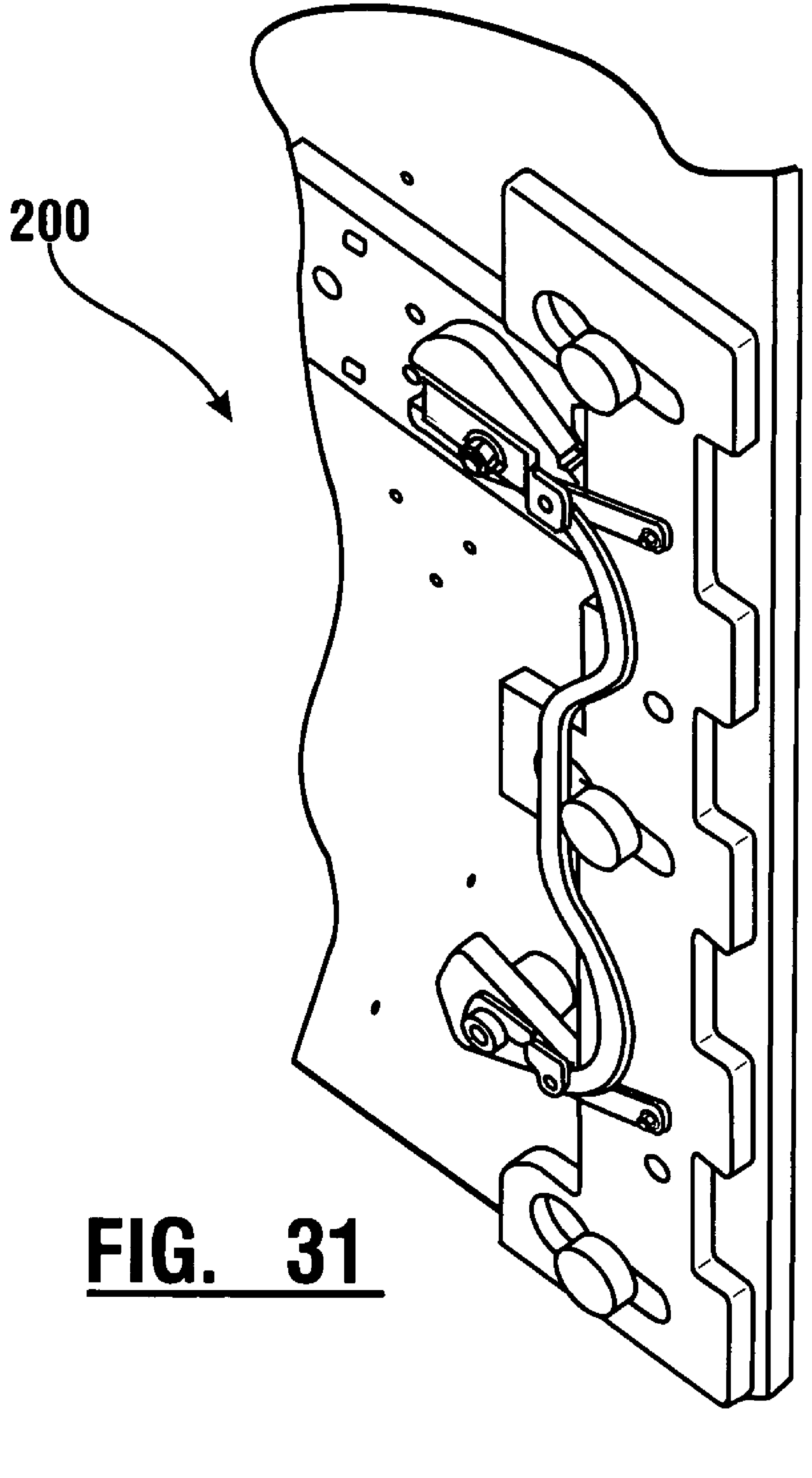
FIG. 31 shows an alternative locking bolt work apparatus.
Figure 32:
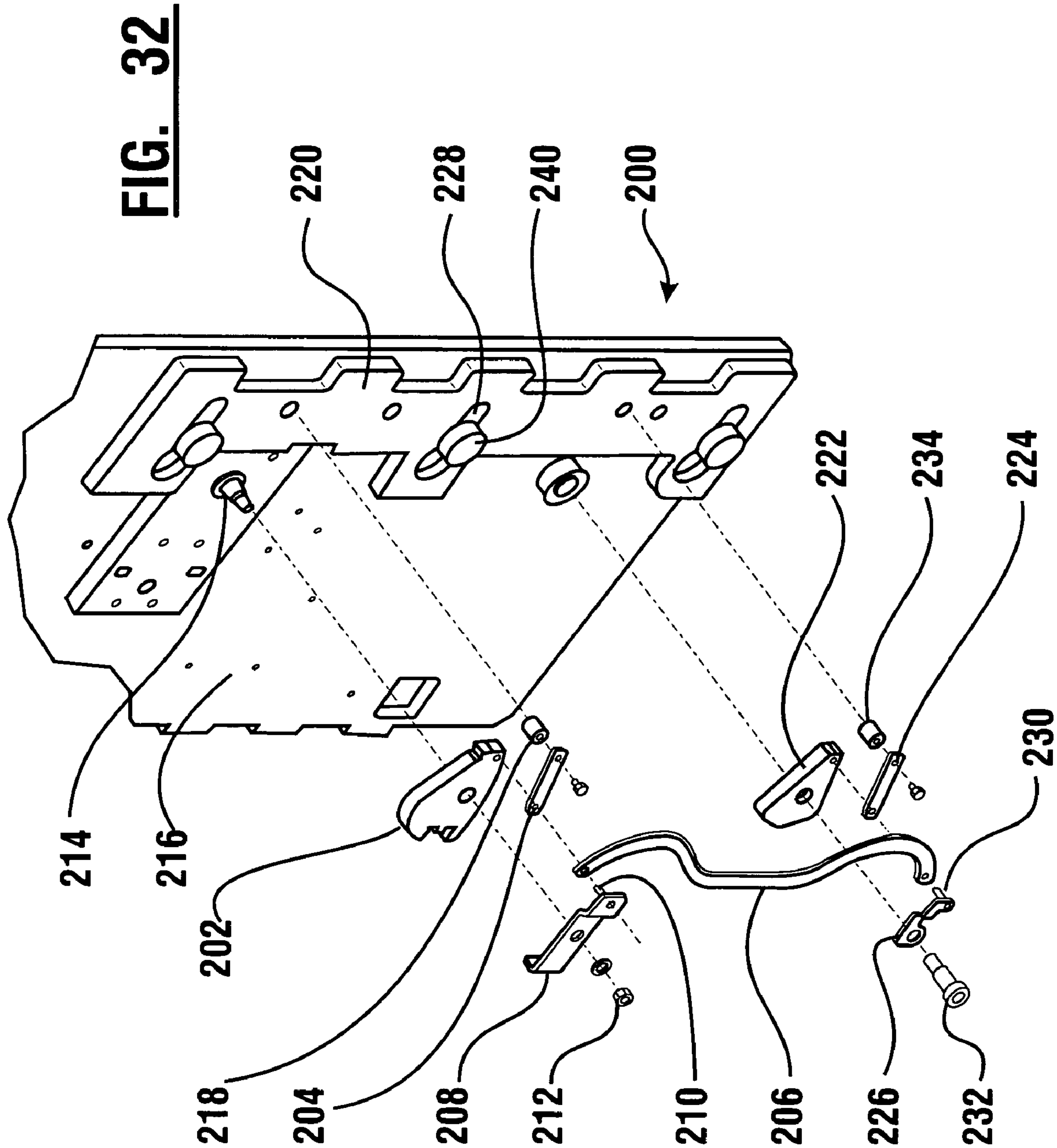
FIG. 32 shows an exploded view of FIG. 31.

An alternative exemplary embodiment of a locking bolt work apparatus 200 is shown in FIG. 31. FIG. 32 shows an exploded view of FIG. 31. The locking bolt work apparatus 200 includes a locking linkage arrangement different from that previously discussed with regard to FIGS. 4 and 5. The locking bolt work apparatus 200 includes a drive linkage arrangement and an idler linkage arrangement.

Figure 33:
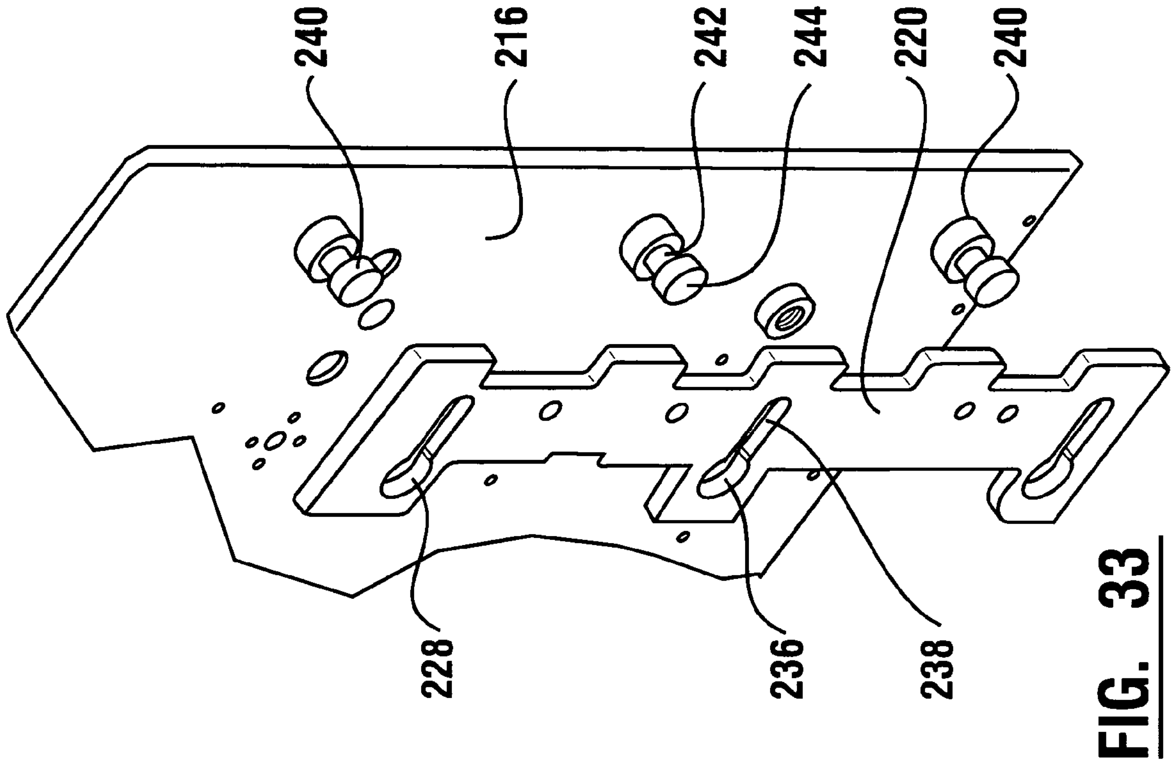
FIG. 33 shows a door with stepped bosses.

FIG. 32 shows a locking bolt (e.g., lock bar) 220. The locking bolt 220 may comprise a laser cut locking bolt. As shown in FIG. 33, a door 216 can include stepped bosses 240. The stepped bosses 240 include a neck portion 242 and a head portion 244. The head 244 has a larger outer diameter than the outer diameter of the neck 242. The elongated locking bolt 220 can have elongated openings or key holes 228. The key holes include a wide head portion 236 and a narrow neck portion 238.

Figure 34:
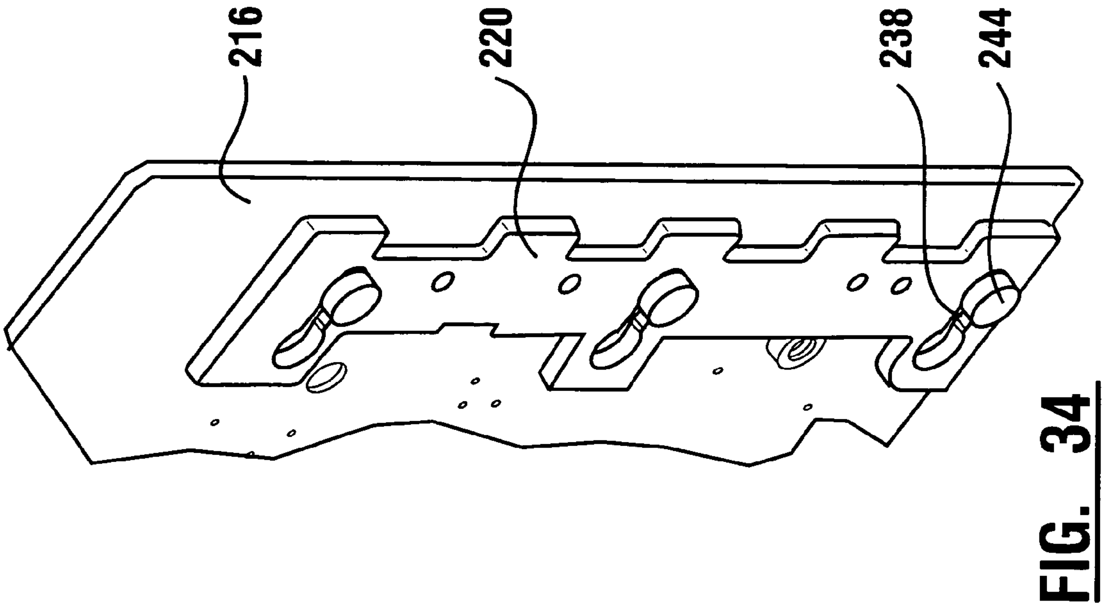
FIG. 34 shows a locking bolt secured to the door of FIG. 33.

The bosses 240 can function to locate the locking bolt 220. The wider portion 236 of a key hole 228 is able to slip over a stepped boss head 244. However, the narrower portion 238 of the key hole prevents passage of the head 244 therethrough. Thus, the bosses can be moved (e.g., slipped or slid) into the narrower portion of the key holes to secure the locking bolt in an operating position. For example, the locking bolt can be secured with the boss heads outside of the narrower portion of the key holes, as shown in FIG. 34. The arrangement can eliminate the need of fasteners to secure the locking bolt.

The locking bolt 220 can be arranged to hang from the uppermost (e.g., top) stepped boss. The top boss can be operative to correctly locate (e.g., guide) and align (e.g., position) the locking bolt. In an exemplary form of the apparatus, the top boss alone can support the locking bolt. The other stepped bosses can be used for security only, eliminating the need for machining. For example, the other stepped bosses can be directed to providing securing of the lock bolt 220 via the narrower key hole portions. The locking bolt can be used with little or no machining, especially regarding machining for alignment purposes. In other arrangements plural stepped bosses can be used to support the locking bolt 220.

The locking bolt 220 can also have a powder-coating (e.g., a powder-coat paint) applied thereto. The coating can be operative to reduce friction between mating parts. Thus, the need for (additional) lubrication such as grease can be eliminated. Additionally, the locking bolt 220 can be used for both front and rear load safes.

The drive linkage arrangement includes a drive cam. FIG. 32 shows a drive cam 202, a link 204 (e.g., drive link or bolt link or lever or short link or upper short link), a connector 206 (e.g., cam link or lever or long link), and a keeper or retainer 208.

The drive cam may comprise a laser cut cam. The connector may comprise a laser cut cam link. The connector may also have substantially flat sides. A flat side can extend from one connector end to the other connector end along a common plane. The cam link may further have a wavy or curving configuration or shape (e.g., a W-shape or a C-shape with oppositely curved ends). The retainer can retain or keep the operative connection of the drive cam 202, the bolt link 204, and the cam link 206. The retainer 208 can comprise a plate.

The drive bolt link 204 and an end (e.g., upper or top portion) of the cam link 206 can be secured to the drive cam 202 by using the drive retainer (or drive plate) 208. The securing arrangement can be absent fasteners. That is, the drive cam, drive bolt link, cam link, and drive retainer connection can be arranged so that no additional fasteners are required. A connector comprising a shaft or pin 210 may be attached to, integral with, or one-piece with the retainer 208. The shaft 210 can protrude through aligned holes in the bolt link 204 and the cam link 206. The shaft 210 can also extend into an opening in the drive cam. The shaft can provide a pivot for the bolt link and the bolt. The shaft 210 connects the drive cam and the bolt link and the cam link. The assembly arrangement can secure the bolt link 204 and cam link 206 intermediate the drive cam 202 and the retainer 208.

A fastener (e.g., a nut) 212 can be used to secure the drive retainer and drive cam. Thus, the fastener 212 can secure the drive linkage arrangement to the door 216. The fastener 212 may be (or include) the same nut that secures a door handle portion 214 to the door 216. The fastener 212 arrangement can provide a pivot for the drive cam and drive retainer.

A bushing 218 can be fastened to the bolt link 204. Alternative arrangements may include providing the bolt link 204 with an integral (or one-piece) bushing end portion. The bushing 218 can be inserted into a hole in the locking bolt 220. The bushing hole in the lock bolt may comprise a laser cut hole or opening. The bushing may be arranged in the bushing hole without being fastened to the lock bolt. The bushing can be retained in the hole by the securement of the drive retainer. However, alternative arrangements may include fastening the bushing to the lock bolt.

The idler linkage arrangement includes an idler cam. FIG. 32 also shows an idler cam 222, a link 224 (e.g., idler link or bolt link or lever or short link or lower short link), and a retainer or keeper 226. The keeper 226 can keep or retain operative connection of the idler cam 222, the bolt link 224, and the cam link 206. The keeper 226 can comprise a plate. The idler bolt link 224 and an opposite end (e.g., lower or bottom portion) of the cam link 206 can be secured to the idler cam 222 by using the idler keeper (or idler plate) 226. The securing arrangement can be absent fasteners. That is, the idler cam, idler bolt link, bolt, and idler keeper connection can be arranged so that no additional fasteners are required. A connector comprising a shaft or pin 230 may be attached to, integral with, or one-piece with the keeper 226. The shaft 230 can protrude through aligned holes in the bolt link 224 and the cam link 206. The shaft 230 can also extend into an opening in the idler cam. The shaft 230 can provide a pivot for the bolt link 224 and the cam link 206. The shaft 230 connects the idler cam and the bolt link and the cam link. The assembly arrangement can secure the bolt link 224 and cam link 206 intermediate the idler cam 222 and the retainer 226. The idler cam and the bolt link and the cam link are rotatable on the shaft.

A fastener (e.g., screw or shoulder screw) 232 can be used to secure the idler keeper and idler cam. The fastener 232 can secure the idler linkage arrangement to the door 216. The fastener 232 arrangement can provide a pivot for the idler cam and idler plate.

A bushing 234 can be fastened to the bolt link 224. Alternative arrangements may include providing the bolt link 224 with an integral (or one-piece) bushing end portion. The bushing 234 can be inserted into a hole (e.g., laser cut hole or opening) in the lock bolt 220. The bushing 234 may be arranged in the bushing hole without being fastened to the lock bolt. The bushing 234 can be retained in the hole by the securement of the idler plate. However, alternative arrangements may include fastening the bushing to the lock bolt.

In an exemplary form of the locking bolt work apparatus 200, the bolt links 204, 224 can be identical. Also, the bushings 218, 234 may be identical. Furthermore, the pins 210, 230 may be identical. Of course other arrangements may use dissimilar links, bushings, and pins.

The locking bolt work apparatus 200 allows for the use of fewer fasteners (e.g., screws), fewer or no washers, a laser cut locking bolt, a flat laser cut cam link, laser cut cams, and laser cut holes. Thus, the locking bolt work apparatus 200 can result in a reduced part count, a reduction in (or elimination of) machining, and easier assembly.

Figure 35:
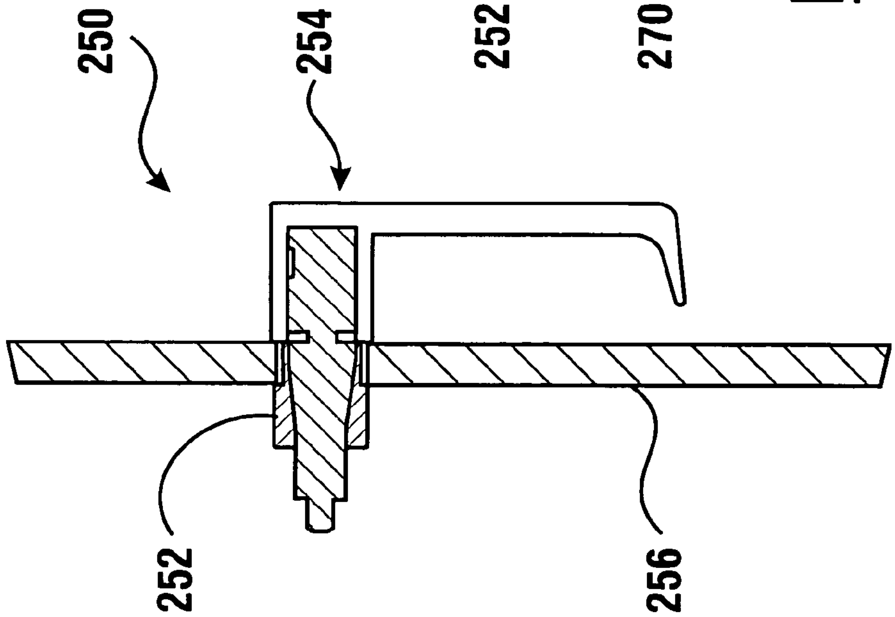
FIG. 35 shows a door handle assembly.

FIG. 35 shows a door handle assembly 250 (e.g., bolt work handle arrangement). The handle assembly includes a sleeve 252 operative to locate and hold a handle 254. The sleeve can be attached to the door 256. The sleeve can have a tapered hole or inner surface 258 along its axis (e.g., through its center or middle portion). The tapered inner surface can receive or accept a tapered outer surface 264 of a handle shaft 260. The sleeve and handle shaft can share a common axis extending through a hole of the door 256. A handle lever 262 may be attached to, integral with, or one-piece with the handle shaft 260. The handle lever 262 is shown located on the outside of the door 256.

Figure 38:
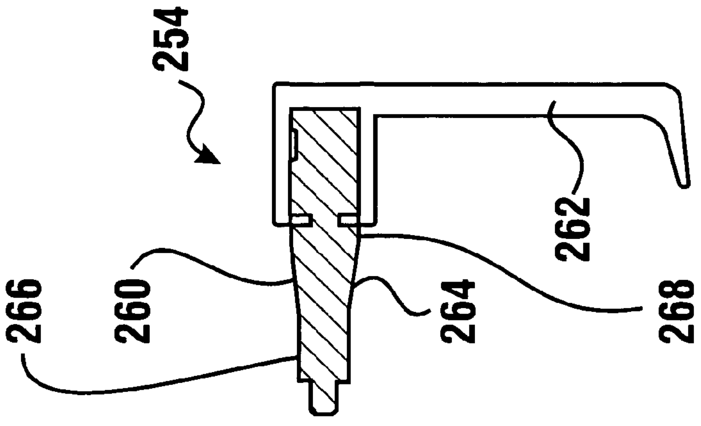
FIG. 38 shows an isolated view of a handle.
Figure 37:
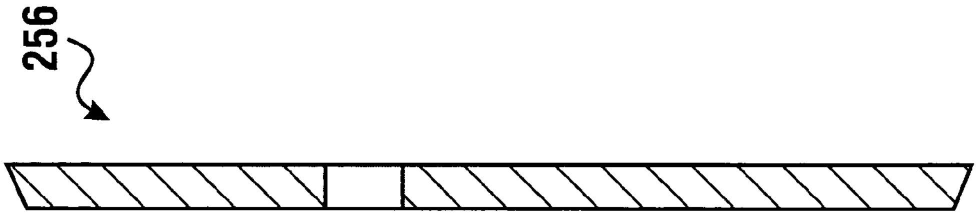
FIG. 37 shows an isolated view of a door.
Figure 36:
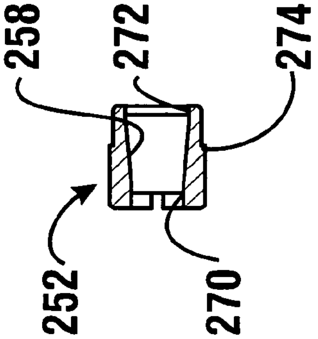
FIG. 36 shows an isolated view of a sleeve.

FIG. 36 shows a separate view of the sleeve 252. FIG. 37 shows a separate view of the door 256. FIG. 38 shows a separate view of the handle 254.

The sleeve can have non-tapered ends which correspond to non-tapered portions on the shaft to provide for alignment of the handle relative to the door. That is, the shaft can have a tapered outer section intermediate a first constant outer diameter surface section 266 and a second constant outer diameter surface section 268. Likewise, the sleeve can have a tapered inner surface section intermediate a first constant inner diameter surface section 270 and a second constant inner diameter surface section 272. The first constant outer diameter surface section can match the first constant inner diameter surface section, and the second constant outer diameter surface section can match the second constant inner diameter surface section. Thus, matching surfaces can achieve alignment of the handle.

The sleeve and the shaft may have angled tapers resulting in engagement over the entire length of the tapered surfaces. The tapered surfaces may also have engaging teeth. The sleeve can be secured to the door, such as by welding or expanding. The sleeve can also have a step or ledge 274 to prevent its passage through (i.e., out of) the door hole, as shown in FIG. 35. The sleeve ledge can extend radially and circumferentially. The sleeve ledge may also comprise a circumferential series of separated radial projections. The shaft may be forced into the sleeve to prevent its removal therefrom.

The door handle assembly 250 provides additional security. For example, if the handle is broken off from the door through its shaft, then the remaining portion of the shaft cannot be forced (e.g., pushed) inwardly through the door. Rather, the two tapered surfaces would be pressed tighter together, preventing the shaft from being pushed through the door. Since the handle (e.g., via the handle shaft) cannot be forced through the sleeve, the locking mechanisms inside the safe would not be able to be disengaged. The safe may be that of an automated banking machine.

The door handle assembly 250 may be used in the locking bolt work apparatus 200. The door can correspond to the door 216. The handle shaft 260 may comprise the door handle portion 214. The shaft 260 may have a threaded portion operative to receive a fastener 212 such as a threaded nut.

The door handle assembly 250, with the relationship of the handle and sleeve as discussed herein, can add a new level of security to a safe.

Figure 39:
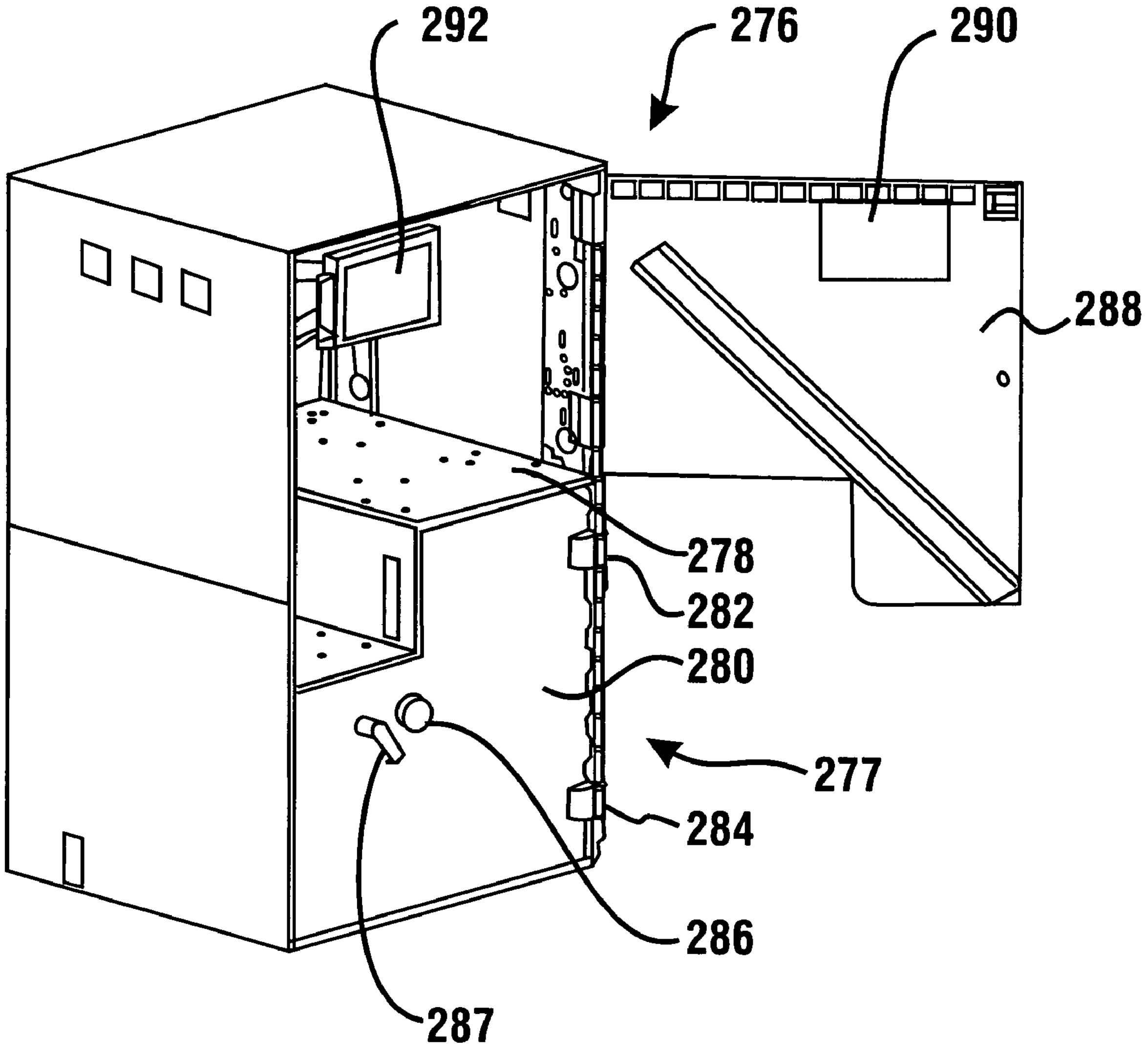
FIG. 39 shows an enclosure for an automated banking machine.

In an alternative exemplary form of the present invention a locking bolt work apparatus can be used with a door having a shape other than rectangular. FIG. 39 shows an automated banking machine 276 having a secure enclosure 277 comprising a safe or chest portion 278 with a moveable door portion 280. The chest portion 278 comprises a generally L-shaped (or stepped) configuration when taken in cross section. The door portion 280 is sized for closing a generally L-shaped (or stepped) opening to the chest 278. Thus, the chest door 280 likewise comprises a generally L-shaped (or stepped) configuration or contour when taken in cross section. As discussed in more detail hereinafter, a locking bolt structure can be provided to secure the door 280 to the chest 278. Moreover, the securement can be provided at different portions or levels along the L-shape. Thus, a locking bolt work apparatus of the invention can add a new level of security to a non-conventionally shaped safe.

Returning to FIG. 39, the chest door 280 can be removably attached to the chest enclosure 278 by (upper and lower) hinge assemblies 282, 284. The chest door 280 is movably mounted to the chest 278. The chest door 280 can have mounted thereon a lock apparatus 286 and a door handle 287. The chest door 280 is shown in a closed position or condition. The chest 278 is part of the automated banking machine 276, such as an ATM or similar apparatus. The automated banking machine 276 also includes a service door 288, shown in an open position. The service door 288 can include a window 290. The window 290 may be used to view a display device, such as a service monitor 292 located within the machine.

It should be understood that different exemplary embodiments can include various L-shape chests. For example, a chest shape may be extended or reduced in either the vertical or horizontal direction of the L. Thus, an L-shaped chest can comprise a non-rectangular chest having six distinct side surfaces when taken in cross section.

The L-shape of the chest 278 enables an automated banking machine to use various arrangements. For example, the upper portion (or leg or vertical or raised portion) of the chest can be placed adjacent to the machine fascia. Thus, the machine can have an arrangement in which cash can be dispensed to a user through corresponding openings in the chest and fascia. Alternatively, the shape of the chest machine 278 can enable a machine to have additional interior space. For example, the lower top surface (or foot or horizontal portion) of the chest can be used to support additional or larger machine components and equipment. Furthermore, the stepped shape of the chest 278 enables usage (and support) of a stepped shaped component.

Figure 40:
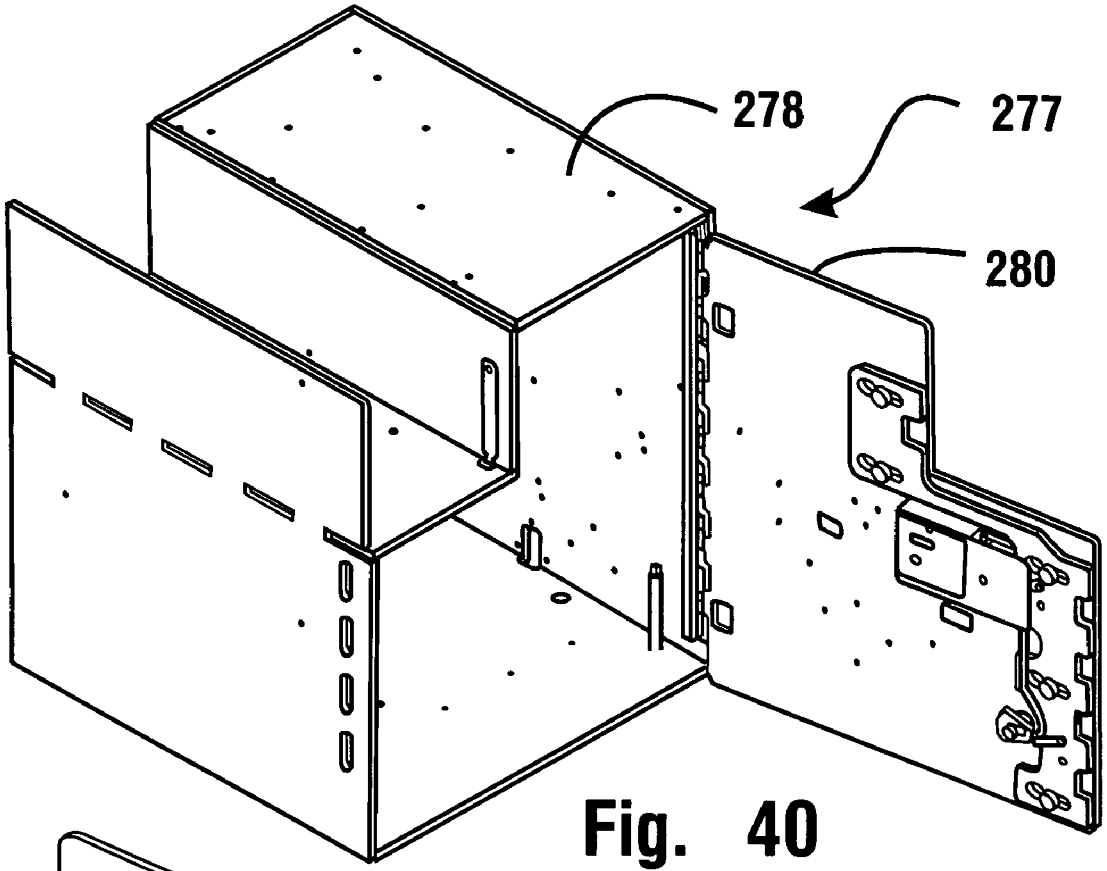
FIG. 40 shows a chest door in an open position.

FIG. 40 shows the chest door 280 of the secure enclosure 277 in an open position or condition. The door 280 is connected to the chest 278 via the hinge attachments. The chest door 280 can rotate, pivot, or move between open and closed positions.

Figure 41:
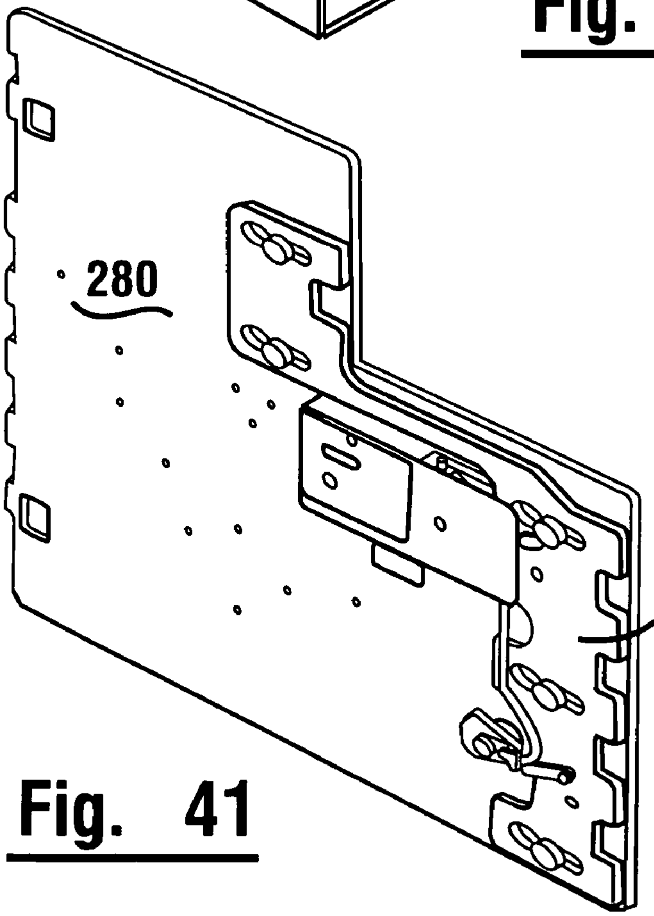
FIG. 41 shows a chest door hinge arrangement.

FIG. 41 shows the door 280 of FIG. 40 in an unhinged or stand-alone position. FIG. 41 also shows a locking bolt work apparatus 300 in an assembled condition. The locking bolt work apparatus 300 includes a locking bolt or locking bar 302. The locking bolt 302 can be removably mounted on the door 280. The locking bolt can be substantially flat on at least one side to facilitate mounting. The door can support the locking bolt via door studs received in locking bolt slots. The locking bolt 302 can be attached to the enclosure door 280 so that it is operative to slidably move between an extended position and a retracted position relative to the door. Thus, the locking bolt can selectively secure the door in a position closing the enclosure chest. Other locking bolt work apparatus components can be respectively connected together with fasteners, as discussed in more detail hereafter.

Figure 42:
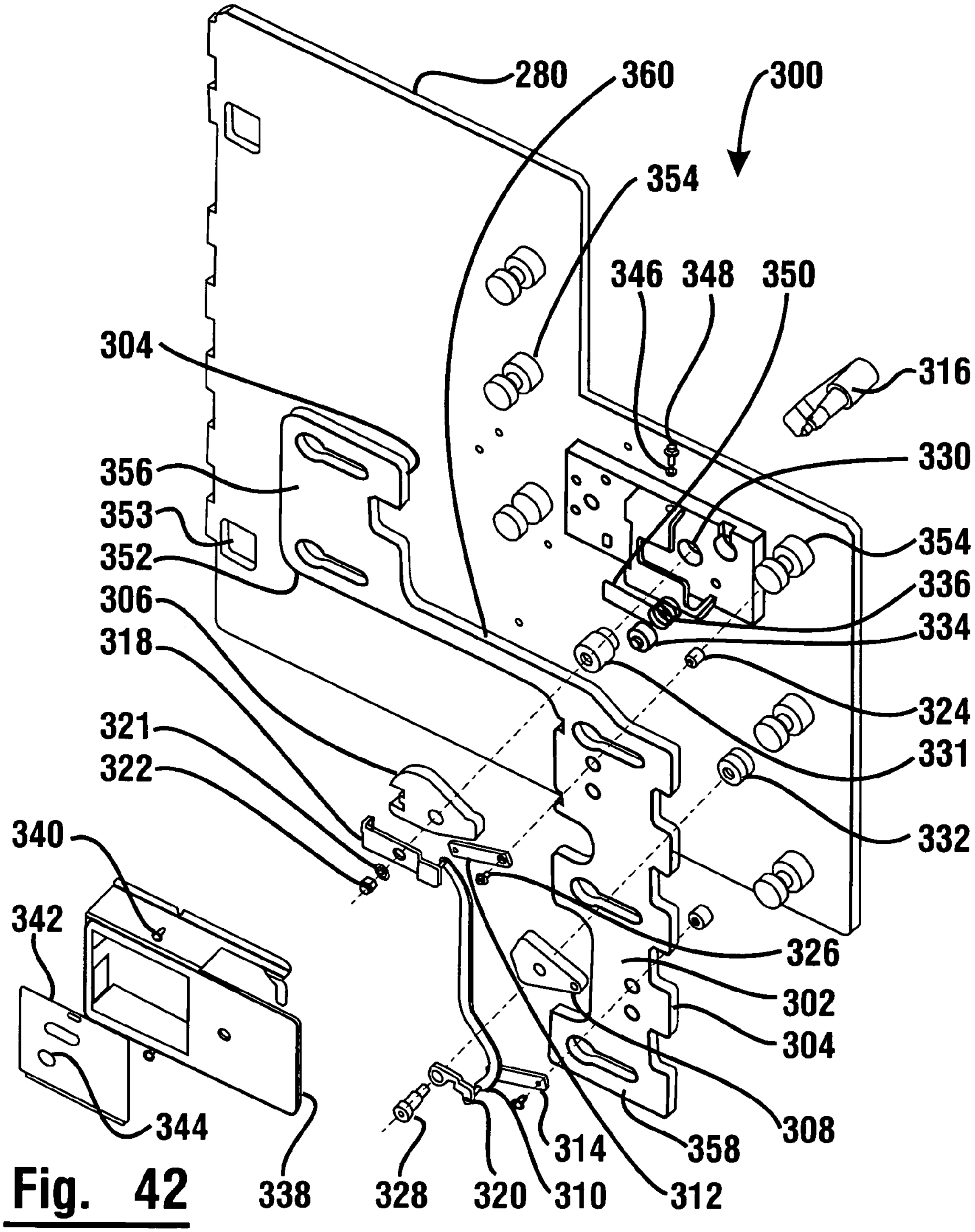
FIG. 42 shows an exploded view of a locking bolt work apparatus.

FIG. 42 shows an exploded view of the locking bolt work apparatus 300. The locking bolt work apparatus includes the locking bolt or locking bar 302. The locking bolt 302 is operative to be supported by and moved relative to the chest door 280. The lock bolt 302 has projections or teeth 304. When the chest door is closed, the locking bolt projections 304 are operative to be moved into locking engagement with a portion of the chest. The locking operation of the locking bolt 302 is similar to the previously discussed locking bolt operation embodiments. For example, the locking bolt 302 can be extended such that the projections 304 engage in respective apertures in a striker side panel or wall of the chest during securing of the chest door 280.

The shape of the locking bolt 302 substantially corresponds to the side of the chest door 280 that will be located adjacent to the striker side panel of the chest 278 during door closure.

As shown in FIG. 42, linkage components of the locking bolt work apparatus 300 include a drive cam 306, idler cam 308, and cam link 310. A drive bolt link 312, idler bolt link 314, and handle assembly 316 are also shown. In a manner previously discussed, the handle assembly 316 can be used to actuate the drive cam 306 to cause movement of the locking bolt 302. The handle assembly 316 may be of the type previously discussed. Conventional handle assembly types may also be applicable.

Other linkage components of the locking bolt work apparatus 300 include a drive keeper 318 (or retainer or linkage holding plate), an idler keeper 320 (or retainer or linkage holding plate), and various fastener arrangements. For example, an exemplary fastener arrangement can include a washer 321, nut 322, pivot pin 324, screw 326, and/or a shoulder screw 328. Also shown is a door weldment 330, sleeve 331, sleeve 332, relock pin 334, helical coil spring 336, relock cover 338, machine screw 340, relock cover plate 342, self tapping pan head screw 344, hex nut 346, pan screw 348, identification label 350, and locking bolt slots 352. Each slot 352 is operative to receive a respective door stud 354 during mounting of the lock bolt to the door 280. The linkage and/or fastener components can function in the self-explanatory manner of FIG. 42, and as previously discussed. It should be understood that other known linkage or fastener components, types, arrangements, and/or combinations may be used.

In the exemplary embodiment of FIG. 42 the locking bolt is of integral or one-piece construction (i.e., a one-piece body). The locking bolt includes a first locking portion or body (e.g., 356) that extends in a first direction. The locking bolt also includes a second locking portion or body (e.g., 358) that extends in a second direction. The locking bolt also includes an intermediate arm portion 360. The locking body portions 356, 358 are connected by the arm portion 360. The locking body portions 356, 358 each include at least one locking projection or latch tooth 304. Furthermore, the second direction is both generally parallel to and generally opposite the first direction. The second locking portion is also spaced from the first locking portion in a third direction. The third direction is generally perpendicular to the first and second directions.

In the example shown in FIG. 42, the first direction is upward, the second direction is downward, and the third direction is relatively horizontal. Of course it should be understood that these direction descriptions are applicable to the shown exemplary arrangement, and that the door and locking bolt may be rotated and used in other arrangements and positions. For example, in another possible arrangement the third direction may be vertically upward, with locking projections moved upward to provide a locking condition.

Returning to FIG. 42, the locking projections 304 extend generally parallel to the third direction. The first and second locking body portions 356, 358 each comprise a set of substantially aligned latch teeth or locking projections 304. For example, the projections 304 in the second body portion 358 are aligned in the second direction. The outermost edges of the locking projections in the second locking portion are also aligned with each other.

The locking projections 304 extend away from their respective locking body portion 356, 358. The projections can extend in substantially the same direction for substantially the same distance. In an exemplary form of the invention, all of the projections are identical in dimension. In the exemplary embodiment of FIG. 42 the lower body portion 358 extends a greater distance in the second direction than the upper body portion 356 extends in the first direction, and the lower body portion 358 also comprises more projections than the upper body portion 356. However, it should be understood that it is within the scope of the invention for a locking bolt to have an upper locking body portion comprising more projections.

Each locking body portion 356, 358 can comprise at least one elongated slot 352. As previously discussed, locking bolt slots 352 are each operative to receive a door stud 354 for use in mounting the locking bolt 302 relative to the door 280. The slots can extend in substantially the same direction and be spaced in coordinated relationship with the door stud spacings. The slots 352 can be key-shaped and comprise a key hole, with a head portion and a narrower neck portion, as previously discussed.

As previously discussed, in an exemplary form of the invention, a locking bolt can be used with a door that has a generally L-shaped (or stepped) configuration or contour when taken in cross section. The door configuration can include an edge portion contour having at least three contiguous distinct edges. The locking bolt can have a stepped configuration when taken in cross section. The locking bolt contour may generally follow (or correspond to or match or align) with a portion of the door contour. For example, the locking bolt contour may substantially match the door edge portion contour. The stepped edge configuration of the locking bolt can provide stepped engagement areas in securing an L-shaped door. This arrangement enables the outermost edges of the locking projections to be substantially aligned with edges of the door. Thus, the projections only need to be moved a short distance outwardly away from the door edges in order to secure the door. This arrangement also enables the sets of projections to be nonaligned yet generally parallel with each other. That is, the alignment of a first set of projections can be perpendicularly offset from the alignment of a second set of projections. As can be seen in FIG. 42, the aligned row of projections in the projection set of body portion 356 are not in alignment with the aligned row of projections in the projection set of body portion 358, yet each of the aligned rows (and sets) are generally parallel with each other.

It should be understood that other locking bolt configurations are within the scope of the invention. In other exemplary forms of the invention a locking bolt can be configured to match an irregular shaped door. For example, a door may have an angled or slanted step instead of a perpendicular step. Therefore, aligned rows of projections may be nonparallel with each other to match the door's slant. Likewise, the arm portion may be non-perpendicular relative to the body portions, e.g., the arm portion may be at a different angle or curved. Still, other locking bolt shapes can be used to correspond to the shape of a door edge. For further example, a locking bolt may have an S-shape to match an S-shaped door edge. Therefore, the projections in a body portion need not be aligned in a row but may curve to follow a curved door edge contour. The shape of a locking bolt of the invention can be made to substantially correspond to the shape of a door edge that will be located adjacent to a striker side panel of a chest. In other arrangements the teeth may project at an angle (e.g., 45 degrees) relative to the body portion, with the drive moving the locking bolt in that angled direction (e.g., 45 degrees) relative to the door. Thus, teeth set at 45 degrees would be moved into corresponding apertures set at 45 degrees in a striker side panel. Furthermore, it should be understood that more than two body portions and plural connecting arm portions may be used in additional locking bolt arrangements.

In operation of the locking bolt work apparatus 300, the drive cam 306 can be rotated in a first direction to enable (via linkage) the locking bolt 302 to be moved to an extended or locking position. The handle assembly 316 may be used to rotate the drive cam 306. With the chest door 280 closed and the locking bolt 302 extended, the locking bolt projections 304 protrude in apertures of the safe enclosure 278. As previously discussed, the locking bolt can be held in the locking position by preventing rotation of the drive cam, such as by secured engagement with a drive cam cut out. Rotation of the drive cam 306 in a second or opposite direction enables the locking bolt 302 to be returned to a retracted or unlocked position, and enables the door 280 to be opened.

A novel aspect of an exemplary embodiment of the construction of a secure enclosure of an automated banking machine (e.g., ATM) is achieved through use of a novel hinge assembly which facilitates installation and adjustment of the door 280 relative to the chest portion 278. The novel hinge construction is shown with respect to the upper hinge assembly 370 in FIG. 43. It should be appreciated that the upper hinge assembly is preferably identical to the lower hinge assembly 372. For this reason only one hinge assembly will be described in detail. Furthermore, although two hinge assemblies are shown, it should be understood that a door can be attached to a chest using more than two hinges.

Figure 43:
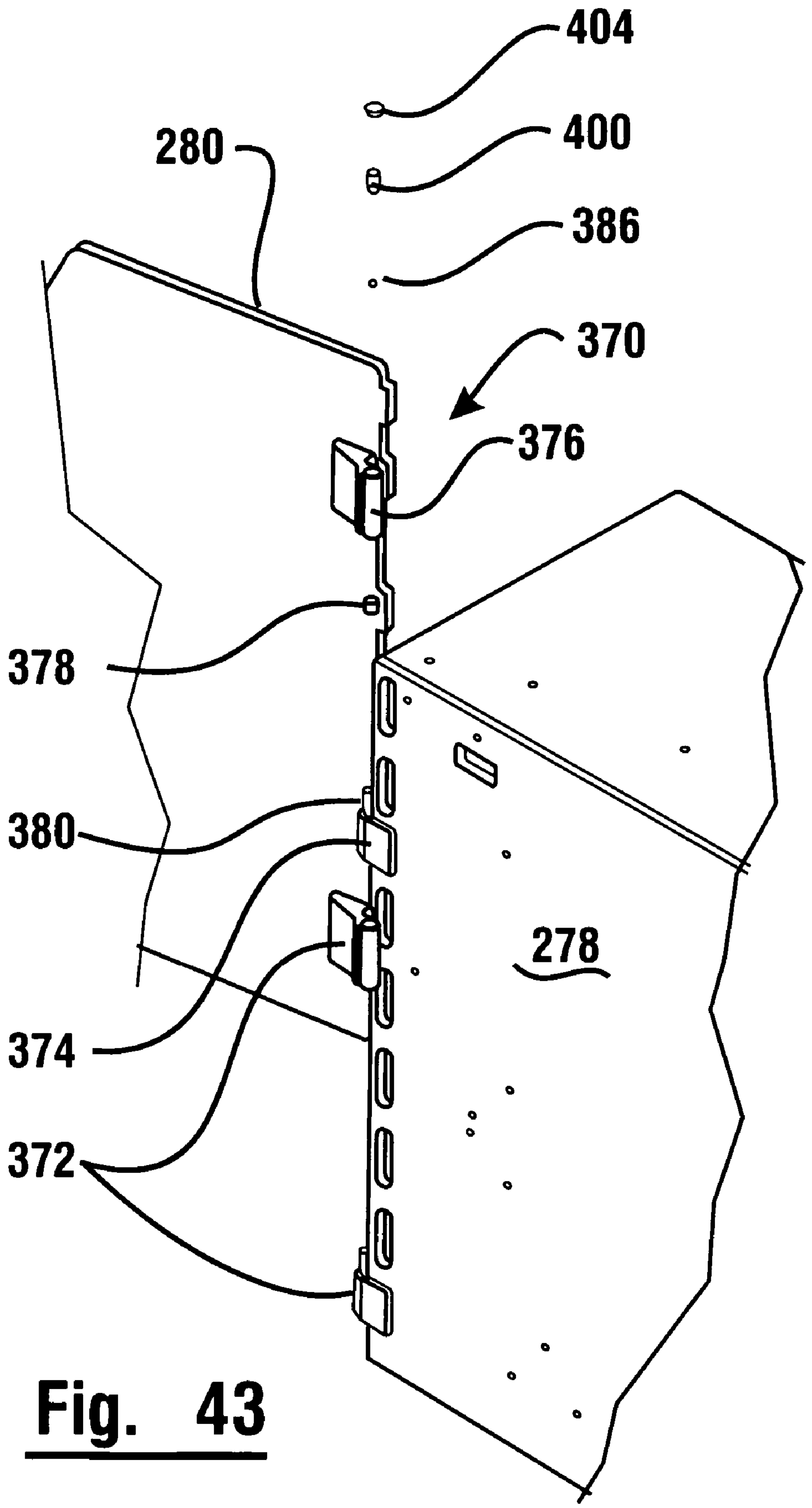
FIG. 43 shows relationships of hinge components during chest door handling.
Figure 44:
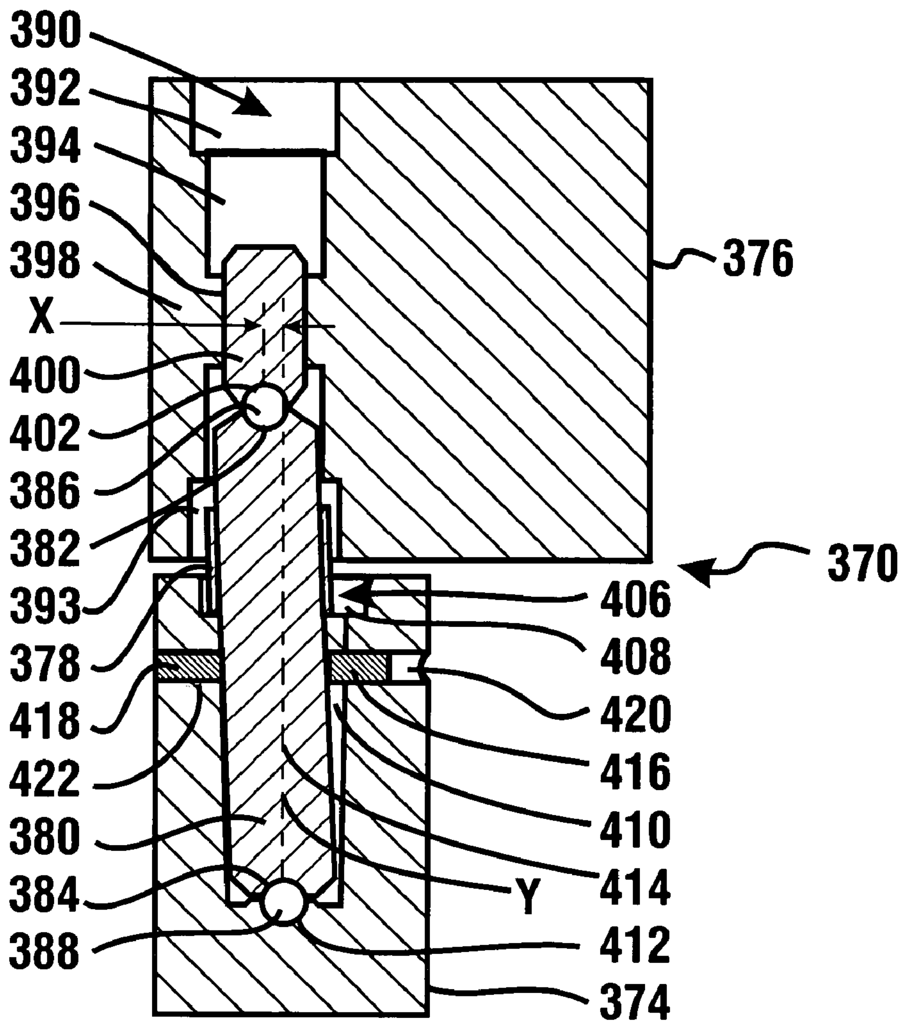
FIG. 44 shows a cross-sectional view of an assembled hinge assembly.

FIG. 43 shows that the door 280 can be assembled to the safe chest 278 using respective hinge assembly components. The hinge assembly 370 includes a chest hinge portion or weldment 374 on the chest and a door hinge portion or weldment 376 on the door. The chest hinge portion 374 and the door hinge portion 376 each include a cavity that is operative to receive a common hinge pin 380. The door 280 can be movably mounted on the chest enclosure 278 when the chest and door hinge portions are engaged via the hinge pin 380. FIG. 43 and FIG. 44 together show other components of the hinge assembly 370 including a protective sleeve or collar 378, an upper recess 382 in the hinge pin, a lower recess 384 in the hinge pin, an upper ball bearing 386, and a lower ball bearing 388. The recesses 382, 384 are adapted for engaging the respective ball bearings 386, 388. The recesses 382, 384 can each comprise a hemispherical recess. Each ball bearing 386, 388 is sized for acceptance into a respective hinge pin recess. A bearing ball surface can extend outside of its respective recess when the ball is positioned therein.

The door hinge portion 376 includes a stepped cavity (or opening or bore) 390. The cavity 390 includes a cavity end portion 392, an intermediate portion 394, and a threaded portion 396 in a radial step 398. As explained in more detail hereinafter, an up-down adjustment member 400 (e.g., a set screw) is operative to move in the door hinge portion 376. The screw 400 has a recess 402 (e.g., hemispherical recess) for engaging the upper ball bearing 386. A cap or plug 404 (shown in FIG. 43) is operative to removably close the door hinge portion cavity 390.

The chest hinge portion 374 includes a cavity (or opening or bore) 406. The cavity 406 includes a cavity end portion 408 and a bore portion 410. The bore 410 has a recess 412 (e.g., hemispherical recess) for engaging the lower ball bearing 388. A longitudinal axis 414 of the bore is also shown. As explained in more detail hereinafter, right-left adjustment (or movable) members 416, 418 (e.g., set screws) are operative to move in respective passages 420, 422 in the chest hinge portion 374. The right-left adjustment members 416, 418 maybe referred to as (first direction) door alignment members. The chest hinge portion 374 includes a right-left direction door alignment arrangement comprising the bore 410, the passages 420, 422, and the door alignment members 416, 418.

Figure 45:
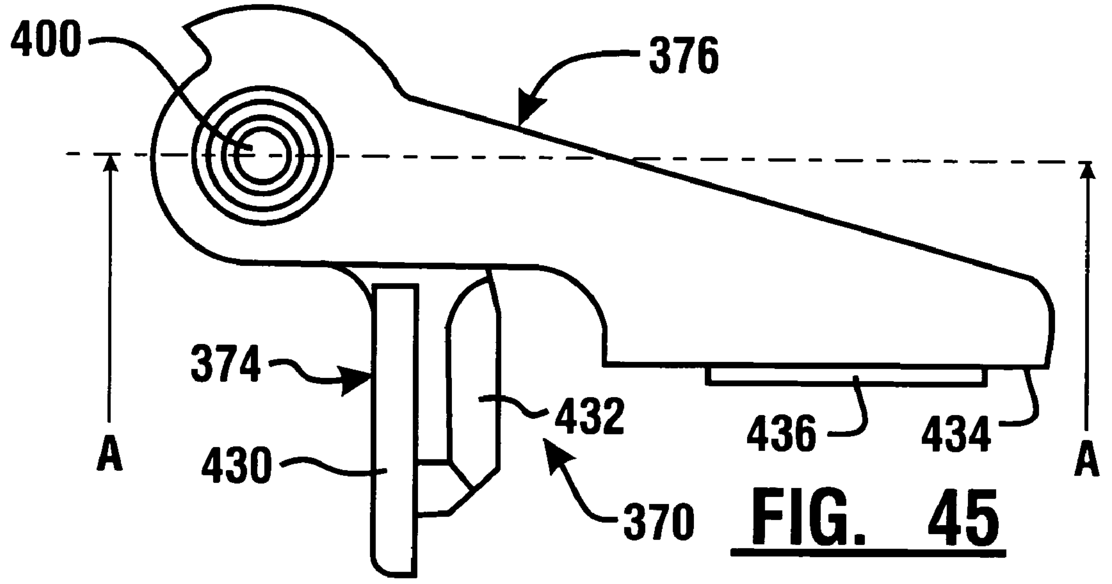
FIG. 45 shows a top view of the hinge assembly of FIG. 44.
Figure 46:
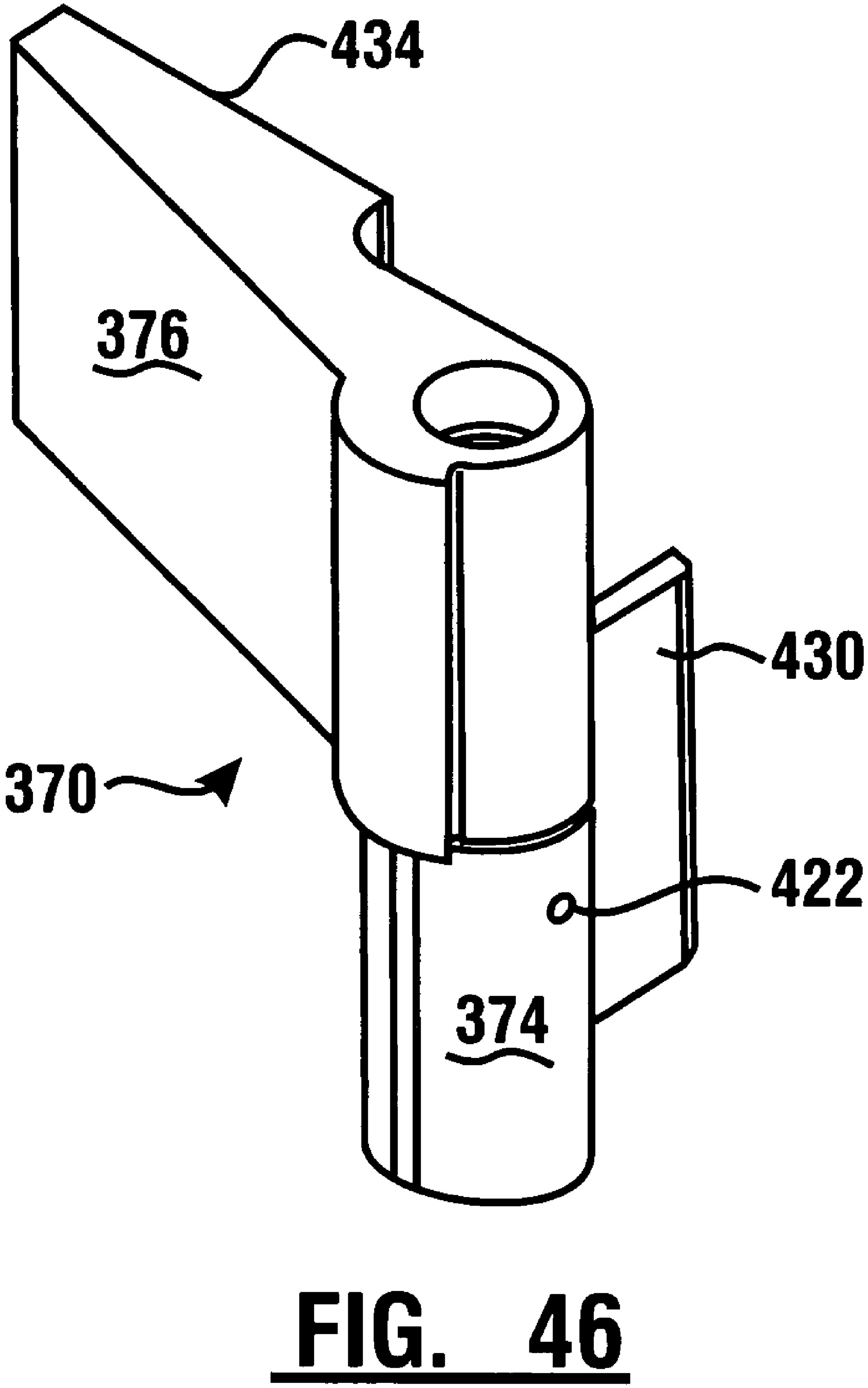
FIG. 46 shows an angled exterior view of the hinge assembly of FIG. 44.

FIG. 44 shows a cross-sectional view of the hinge assembly 370. FIG. 45 shows a top view of the hinge assembly 370. The cross-sectional view of FIG. 44 is taken along A—A of FIG. 45. FIG. 46 shows an angled exterior view of the hinge assembly 370. The chest hinge portion 374 includes an alignment plate portion 430 and a projection 432. The projection 432 is sized for acceptance into a cut out of a hinge side panel, such as the upper cut out 37 in the hinge side panel 36 of FIG. 3. Projection 432 is configured to be readily accurately positioned in the cut out prior to welding of the chest hinge portion to a hinge side panel. The chest hinge portion 374 can be welded in place in the cut out at the interior surface of the hinge side panel. This avoids having welds that are exposed on the exterior of the chest enclosure 278.

The door hinge 376 further includes a door engaging portion 434. Door engaging portion 434 includes a raised projection 436. Raised projection 436 is sized for acceptance in a hinge mount opening 353 (FIG. 42) in the door 280. Hinge mount openings can accept raised projections and facilitate welding of the door hinge portion to the door. The door hinge portions are preferably mounted in the openings and welded therein at the interior surface of the door.

FIG. 44 shows the hinge assembly 370 with the hinge components in an assembled condition. The hinge assembly 370 includes the hinge pin 380 extending into adjacent respective cavities 390, 406 of the chest hinge portion 374 and the door hinge portion 376. The use of hinge assemblies 370 of the exemplary embodiment, when mounting a door to an enclosure, enables the door to be selectively adjusted in up-down and right-left directions.

In an exemplary embodiment, the cavity 390 of the door hinge portion is a multi-diameter or stepped annular cavity. The cavity head or end portion 392 has a larger diameter than the intermediate portion 394 which in turn has a larger diameter than the threaded portion 396. The end portion 392 and intermediate portion 394 are sized to receive the hinge pin 380. The end portion 392 is also sized to receive the protective security sleeve or collar 378. The threaded portion is bounded by the step 398. The step 398 can be an annular radially extending step with an inner (or central) threading that corresponds to the threading of the set screw 400. The up-down adjustment set screw 400 is rotated to move relative to the step 398 via the corresponding threads. In the exemplary embodiment the door hinge portion 376 is symmetrical, with the cavity portion on each side of the step 398 being the same size. Thus, the upper 392 and lower 393 cavity end portions are the same size, with each operative to receive the plug 404. As a result of the door hinge symmetry, the door hinge portion 376 is suitable for both right or left hand mounting.

The up-down threaded adjusting member 400 is configured for threaded movable engagement with the threaded step 398 of the door hinge. As a result, the adjusting screw is movable axially in the cavity 390. The adjusting screw 400 is movably adjustable in an up-down direction to enable the door 280 to be adjusted in an up-down direction. The up-down adjustment (or movable) member 400 may also be referred to as a (second direction) door alignment member. The door hinge portion 376 includes an up-down direction door alignment arrangement comprising the door alignment member 400 and the threaded step 398. The recess 402 in the screw 400 corresponds to the size and shape of the upper ball bearing 386. This relationship enables the upper ball bearing 386 to be engagingly received in the screw recess 402. The upper ball bearing 386 can also provide a point for the door 280 to rotate about.

The plug 404 can serve to close the cavity 390 and is accepted in releasable engagement in the end portion 392. The plug can assist in preventing debris from entering the cavity. The plug can also be used for security or cosmetic (i.e., appearance) purposes.

The end portion 408 of the chest hinge portion cavity 406 has a larger diameter than the elongated bore portion 410. The end portion 408 and bore 410 are sized to receive the hinge pin 380. The end portion 408 is also sized to receive the protective security sleeve 378. The size and shape of the bore recess 412 can correspond to or match that of the lower bearing ball 388, enabling the ball to rest in the recess. The hinge pin 380 can be pivoted during right-left adjustment of the door 280. The lower bearing ball 388 can provide a pivot point for the hinge pin 380. Although only one bearing ball has been described to facilitate understanding of the bearing features, it should be understood that other exemplary embodiments using ball bearings comprising more than one bearing ball are within the scope of the invention.

The right-left adjustment threaded set screws 416, 418 are rotationally movable in the respective threaded passages 420, 422 in the chest hinge portion 374. A right-left adjustment of the door 280 can be accomplished by adjusting the position of the screws 416, 418. The screws are operative to engage the hinge pin 380 to cause pivoting (or tilting or rotating) of the hinge pin about the lower ball bearing 388. This pivoting action can create an offset between the upper ball bearing 386 and the lower ball bearing 388. This offset contributes to door adjustment in either a right or left direction relative to the chest. The adjusting screws 416, 418 are located in the chest hinge portion 374 and can be individually adjusted so that alignment of the door in a right-left direction or orientation can be achieved and maintained.

The bore 410 of the chest hinge portion 374 is adapted to receive or accept the hinge pin 380 therein. In an exemplary embodiment, the bore 410 is elongated right-left to permit pivoting movement of the hinge pin 380. However, the bore is not elongated front-back. That is, the width of the chest hinge bore 410 in the front-back direction limits or prevents movement of the hinge pin 380 in the front-back direction. This arrangement enables the pin 380 to correspondingly move with movement of the screws 416, 418. The bore 410 can be tapered along the right-left direction to cause the right-left elongation. Alternatively, the right-left elongation may have a constant diameter.

The adjusting screws 416, 418 can be radially opposed and located on a common plane which contains a first bore diameter of the right-left elongation. This first bore diameter (along which the screws 416, 418 are radially located) is larger than the bore diameter perpendicular thereto on the common plane. That is, at the common plane of the screws 416, 418, the right-left diameter (i.e., the first bore diameter) is wider than the front-back diameter (i.e., the perpendicular diameter).

In the arrangement of FIG. 44 the hinge pin 380 (and thus the door hinge 376) is shown as having been moved in a leftward direction with respect to the longitudinal axis 414 of the bore 410. The symbol d represents the distance along the horizontal axis x that the upper bearing ball 386 is offset from the centered vertical axis y (i.e., longitudinal axis 414). In this example, the distance d is representative of the distance that the door was moved in the right-left direction during alignment of the door with respect to the chest opening. In another example the pin 380 may be initially inserted as misaligned with the longitudinal axis 414. Thus, in the another example the distance d may not be reflective of the actual distance that the door was moved, but the final axial offset position required to achieve door alignment in the right-left direction.

The protective security sleeve 378 can be used to prevent cutting of the hinge pin 380. The protective security sleeve 378 can comprise a hardened collar that is sized for acceptance in both the cavity 390 of the door hinge as well as the cavity 406 of the chest hinge. The collar 378 is sized to be readily insertable over the hinge pin 380. In the exemplary embodiment the diameter of the collar 378 is larger than the diameter of the bore 410 to prevent entry therein. The collar can be simultaneously positioned in both the door hinge lower cavity end portion 393 and the chest hinge cavity end portion 408. In an exemplary embodiment the collar 378 is rotatably movable when installed. The ability of the collar to rotate further decreases the ability to cut therethrough.

In exemplary embodiments of the invention, the door adjustment features enable movement of a door in plural directions. As discussed herein, a door can be moved for alignment in substantially perpendicular directions (e.g., up-down and right-left directions).

An exemplary installation and operation of the exemplary hinge assembly 370 will now be discussed with reference to FIG. 44. In an exemplary assembly process, plural identical hinge assemblies 370, 372 are used to mount the door 280 to the enclosure 278 in alignment. Thus, only the installation of only one hinge assembly 370 needs to be described.

The cooperating hinge portions 374, 376 of hinge assembly 370 can be attached in separate operations. That is, the chest hinge portion 374 is separately attached (e.g., via welding) to the chest 278 and the door hinge portion 376 is separately attached (e.g., via welding) to the door 280. The lower bearing ball 388 is placed in the recess 412 of the bore 410. The hinge pin 380 is inserted into the chest hinge bore 410 in supporting engagement with the bearing ball 388. The protective sleeve 378 is placed around the pin 380 and comes to rest in the chest hinge cavity end portion 408. The upper bearing ball 386 is placed in the hinge pin recess 382. The door 280 (comprising plural hinge assemblies 370, 372) is then mounted onto the chest 278. The door hinge portion (s) 376 are placed on respective hinge pin(s) 380. Because of the welded attachments, the initial mounting may be somewhat misaligned. Returning to hinge assembly 370, the mounting causes the up-down adjustment screw 400 to be engaged with the upper bearing ball 386. An attempt can be made to close and lock the door. A determination (e.g., by service personnel) can then be made as to whether the door needs to be more accurately aligned with the chest opening. If necessary, the right-left door alignment members (e.g., set screws 416, 418) and the up-down door alignment member (e.g., set screw 400) are accordingly adjusted by rotation thereof to achieve the desired door alignment. Thereafter, the cap 404 is placed on the door hinge portion 376.

In the assembled condition of the hinge assembly, the collar 378 extends in the annular cavity end portions 393, 408 in surrounding relation of the hinge pin 380. The hinge pin extends upward into the door hinge 376 and downward into the chest hinge 374. As previously discussed, the bore 410 is elongated in the right-left direction. Thus, the chest hinge bore 410 is configured to permit pivoting movement of the hinge pin 380 in the right-left direction. This configuration also enables the hinge pin to be accepted even though the hinge pin may be misaligned (i.e., not be perfectly co-axial) with the longitudinal axis 414 of the chest hinge bore. This construction enables the door 280 to be mounted on the chest 278 even though the hinge pins may be slightly misaligned.

In the assembled condition of the hinge assembly, the lower bearing ball 388 is securely held between the recesses 384, 412. The upper bearing ball 386 is securely held between the hinge pin recess 382 and the screw recess 402. As can be appreciated, because the axial adjusting screw 400 is threaded in the threaded step 398 of the door hinge, it can be moved to adjust the relative vertical positions of the hinge components. This can be accomplished by inserting a tool through the upper access opening 392 of the door hinge cavity 390 to engage the up-down adjusting screw 400 (e.g., via a socket opening in the adjusting screw). This enables the door 280 to be selectively adjusted (e.g., in a vertically direction) so that its up-down alignment is fitted relative to the chest enclosure opening.

The right-left adjusting screws 416, 418 can also be adjusted (e.g., in a horizontal direction) so that the door's right-left alignment can correspond to the chest enclosure opening. This can be accomplished by inserting a tool through (if necessary) respective threaded passages 420, 422 to engage the right-left adjusting screws 416, 418 (e.g., via a socket opening in each adjusting screw). The plug 404 can be removably placed into position in the door hinge cavity 390 to cover entry 392 thereof. The plug 404 can be installed after the up-down adjustment screw 400 has been appropriately positioned. As a result of proper door alignment, a locking bolt mechanism associated with the door can be properly operated to engage corresponding chest apertures to securely lock the door 280 to the chest 278.

It should be understood that the arrangement shown in FIG. 44 is exemplary and in other embodiments other arrangements may be used. Furthermore, the directional terms up-down (or vertical) and right-left (or horizontal) are merely examples of directional movement to facilitate understanding with regard to the description of FIG. 44. The described novel door adjustment features are not limited to these directional terms nor any specific directional orientation. For example, the door adjustment features described herein are also applicable to chest doors arranged in other operating positions (e.g., a side door opening top to bottom (instead of from side to side); and a top door opening side to side). Furthermore, the door adjustment features described herein are also applicable to doors arranged in a variety of shapes (e.g., rectangular, non-rectangular, L-shaped, stepped, non-conventional). Thus, the scope of door adjustment features described herein encompass broad use with a wide range of door shapes and door orientations.

It will be appreciated that the hinge structure of the exemplary embodiment enables hinge portions to be initially assembled somewhat misaligned relative to one another due to minor inaccuracies in the assembly process or variations in materials. Despite the cavities and hinge pins of respective hinge portions not being co-axial, the hinge assembly construction still enables mounting of a door onto a secure chest enclosure. Thus, the hinges may still be assembled with the door movably mounted on the enclosure despite minor misalignment of the hinge components.

It will also be appreciated that once a door is mounted on the chest (even with misalignment), the adjusting screws in the hinge assemblies can be appropriately positioned so as to align the door relative to the chest. This enables the door to be fit precisely with respect to the chest opening when the door is closed. It further enables the alignment of accepting apertures with locking projections. Thus, a door can be aligned to match an opening in an enclosure.

Furthermore, the hinge assembly construction of the exemplary embodiment enables the door to be removable in the open condition. Thus, there is no requirement to have the door permanently secured to the enclosure by the hinges. This is because when the door is in the closed position the action of the dead bolt projections and the dead bolt accepting apertures hold the hinge side of the door secured. This further facilitates the assembly process because it enables the chest hinge portions to be attached to the chest and the door hinge portions to be attached to the door in separate operations. During certain servicing procedures it may also be desirable to remove the door for purposes of accessing items in the interior area of the secure enclosure. The exemplary hinge assembly construction enables the door to be removed.

The hinge design and assembly method of the invention are also particularly useful when more than two hinges are used to attach a door to an enclosure. The hinge portions can be slightly misaligned both axially (e.g., vertically) and laterally (e.g., horizontally). Axial and lateral adjustments can be made to accurately position the door in aligned relationship with the enclosure. A wide variety of misaligned door orientations can be corrected. Thus, the exemplary hinge features permit an enclosure door to be readily attached (even with some misalignment) and accurately aligned.

Figure 47:
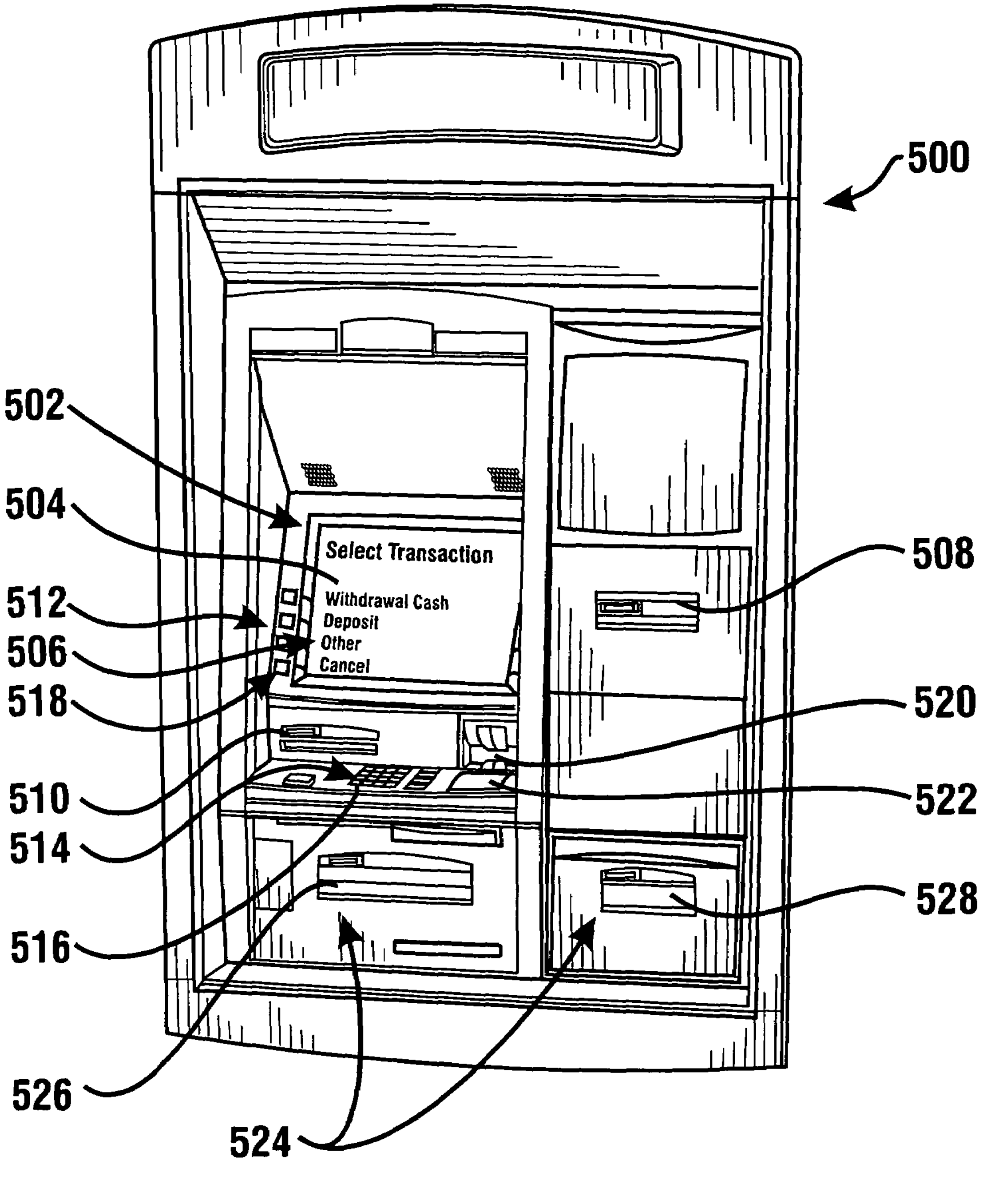
FIG. 47 shows an automated banking machine.

FIG. 47 shows an alternative automated banking machine 500, such as an ATM or similar apparatus. The automated banking machine 500 may include any of the previously discussed locking bolt work arrangements. In an exemplary embodiment, the automated banking machine 500 includes a fascia 502 which serves as a user or customer interface. The machine further includes at least one output device, such as a display device 504. The display device is operative to provide a user with a screen 506 that can comprise selectable options for operating the machine. The machine 500 can further include other types of output devices, such as a receipt printer 508, a statement printer 510, speakers, or any other type of device that is capable of outputting visual, audible, or other sensory perceptible information.

The automated banking machine 500 may also include a plurality of input devices 512, such as an encrypting pin pad (EPP) 514 with keys 516, function keys 518, and a card reader 520 and bar code reader 522. The machine 500 may further include or use other types of input devices, such as a touch screen, microphone, or any other device that is operative to provide the machine with inputs representative of user instructions or information. The machine may also include one or more biometric input devices such as a fingerprint scanner, an iris scanner, facial recognition device, hand scanner, or any other biometric reading device which may be used to read a biometric input that can be used to identify a user and/or permit a user to use the machine.

The exemplary embodiment of the automated banking machine 500 may further include a plurality of transaction function devices 524 which may include, for example, a cash dispenser 526, a depository mechanism 528 (which can include a cash acceptor, a check acceptor, a check imager, and/or an envelope depository), a cash recycler mechanism, or any other type of device which is operative to perform transaction functions involving transfers of value.

The exemplary embodiment of the automated banking machine 370 further includes a housing (the front side being shown) for housing the previously discussed transaction function devices, secure chest, and locking bolt work arrangement. For example, in and exemplary embodiment, an upper housing portion which is in supporting connection with the chest may house the display screen, card reader, and printer of the machine.

Thus the new secure enclosure for an automated banking machine and method of the exemplary embodiment of the present invention achieves above stated objectives, eliminates difficulties encountered in the use of prior devices and methods, solves problems, and attains the desirable results described herein.

In the foregoing description certain terms have been used for brevity, clarity and understanding. However no unnecessary limitations are to be implied therefrom because such terms are for descriptive purposes and are intended to be broadly construed. Moreover the descriptions and illustrations herein are by way of examples and the invention is not limited to the details shown and described.

In the following claims any feature described as a means for performing a function shall be construed as encompassing any means capable of performing the recited function, and shall not be deemed limited to the particular means shown in the foregoing description or mere equivalents thereof.

Having described the features, discoveries and principles of the invention, the manner in which it is constructed and operated and the advantages and useful results attained; the new and useful structures, devices, elements, arrangements, parts, combinations, systems, equipment, operations, methods, processes, and relationships are set forth in the appended claims.

We claim:

1. A method of mounting a door in supporting connection with a chest of a currency sheet dispensing automated banking machine adapted to store currency sheets in the chest comprising:

a) attaching a first hinge component in supporting connection with the chest of the automated banking machine, wherein the chest includes an opening, wherein the first hinge component includes a first bore that is operative to accept a hinge pin therein;

b) attaching a second hinge component in supporting connection with the door, wherein the door is sized for closing the opening of the chest, wherein the second hinge component includes a second bore operative to accept the hinge pin therein, wherein each of the first and second bores each extend along a respective longitudinal axis;

c) engaging the door with the chest, wherein the hinge pin extends in the first and second bores in supporting connection with the first and second hinge components;

d) moving the door in a first direction relative to the opening by causing at least one movable door alignment member to urge the hinge pin to pivot in at least one of the first and second bores relative to the longitudinal axis of the respective at least one of the first and second bores, wherein the at least one movable door alignment member is in operative connection with at least one of the first and second bores.

2. The method according to claim 1, further comprising mounting at least portions of a currency sheet dispenser within the chest.

3. The method according to claim 1, wherein in (d) the at least one door alignment member comprises a first direction door alignment member, wherein (d) includes adjusting a position of the first direction door alignment member radially relative at least one of the first and second bores to urge the hinge pin to pivot, and further comprising (e) moving the door in a second direction relative to the opening by adjusting a position of a second direction door alignment member axially in at least one of the first and second bores, wherein the second direction is substantially perpendicular to the first direction, wherein the hinge pin is in supporting connection with the second direction door alignment member, wherein positional adjustment of the second direction door alignment member axially in at least one of the first and second bores is operative to change an amount of depth the hinge pin extends in the respective one of the first or second bores.

4. The method according to claim 3, wherein in (a) the first hinge component includes the second direction door alignment member, and wherein in (b) the second hinge component includes the first direction door alignment member.

5. The method according to claim 1, wherein in (d) the at least one door alignment member comprises a first movable member and a second movable member, wherein in (d) the hinge pin pivots to a first angle with respect to the longitudinal axis of the at least one of the first and second bores, and further comprising (e) moving the door in a second direction relative to the opening by causing the second movable member to urge the pin to pivot in at least one of the first and second bores to a second angle with respect to the longitudinal axis of the respective at least one of the first and second bores, wherein the second direction is substantially opposite the first direction.

6. The method according to claim 5, further comprising (f) moving the door in a third direction relative to the opening by adjusting the position of a third movable member in operative connection with one of the first or second hinge components, wherein the third direction is substantially perpendicular to the first and second directions, wherein the hinge pin is in supporting connection with the third movable member.

7. The method according to claim 6, wherein in (a) the first hinge component includes the third movable member, wherein (f) includes moving the third movable member axially in the first bore, and wherein in (b) the second hinge component includes the first movable member and the second movable member, wherein (d) includes moving the first movable member radially with respect to the second bore, wherein (e) includes moving the second movable member radially with respect to the second bore.

8. The method according to claim 6, wherein in (d) and (e) the first and second movable members each comprise a set screw in threaded connection with the second hinge component which are movable in radial directions with respect to the second bore to cause the door to move in horizontal directions with respect to the opening, wherein in (f), the third movable member comprises a set screw in threaded connection with the first hinge component which is movable axially in the first bore to cause the door to move in vertical directions with respect to the opening, wherein (d), (e), and (f) include rotating the set screws.

9. The method according to claim 1, wherein in (c) a first end of the hinge pin is engaged with a first bearing ball and a second end of the hinge pin is engaged with a second bearing ball, and wherein (d) includes urging the hinge pin to pivot in both the first and second bores while the hinge pin is in engagement with the first and second bearing balls.

10. The method according to claim 1, wherein (d) includes radially moving the at least one door alignment member relative at least one of the first and second bores to urge the hinge pin to pivot.

11. A method of mounting a door in supporting connection with a chest of a currency sheet dispensing automated banking machine adapted to store currency sheets in the chest comprising:

a) attaching a lower hinge component in supporting connection with the chest of the automated banking machine, wherein the chest includes an opening;

b) attaching an upper hinge component in supporting connection with the door, wherein the door is sized for closing the opening of the chest, wherein the lower hinge component includes a lower bore and the upper hinge component includes an upper bore, wherein each bore is sized for accepting a pin therein;

c) mounting the door to the chest by lowering the upper hinge component to a position above the lower hinge component, including relatively moving the pin and upper and lower hinge components such that the pin extends in both the upper or lower bores, wherein at least one of the lower and upper hinge components includes at least one first movable member, wherein at least one of the lower and upper hinge components includes at least one second movable member, wherein when the pin extends in both the upper and lower bores the pin is in supporting connection with the at least one second movable member;

d) adjusting a horizontal position of the door relative to the opening by causing the pin to pivot in at least one of the lower and upper bores with respect to a longitudinal axis of the at least one of the lower and upper bores responsive to movement of the at least one first movable member radially with respect to the at least one of the lower and upper bores;

e) adjusting a vertical position of the door relative to the opening by causing a change in a depth the pin extends in at least one of the lower and upper bores responsive to movement of the at least one second movable member axially with respect to the at least one of the lower and upper bores, wherein (d) and (e) are performed in any order.

12. The method according to claim 11, wherein in (a) the chest includes a wall extending generally adjacent to the opening, wherein the wall includes in operative connection therewith one of either an aperture or a projection, wherein in (b) the door includes in operative connection therewith the other of either the aperture or the projection, wherein further comprising:

f) moving the door to a closed position in the opening, wherein the projection engages the aperture, whereby the engagement of the projection and the aperture is operative to prevent the door from being removed from the chest.

13. The method according to claim 12, wherein one of either the door or the chest is in supporting connection with a lock, wherein the lock is changeable between locked and unlocked conditions, wherein in the locked condition the door is held in a closed position relative the opening and wherein in the unlocked position the door is enabled to be disposed from the opening, and further comprising subsequent to (f), the step of placing the lock in the locked position.

14. The method according to claim 11, wherein the pin includes two opposed ends, wherein each of the opposed ends includes a generally hemispherical surface in supporting connection therewith, and wherein in (c) both the lower and the upper hinge components operatively engage the hemispherical surface.

15. The method according to claim 11, wherein the pin includes two opposed ends, wherein each of the opposed ends includes an axial recess, wherein in (c) generally spherical members are partially accepted in the axial recesses at each end of the pin, wherein the lower and the upper hinge components operatively engage the spherical members.

16. The method according to claim 11, and prior to step (c) further comprising the step of extending a collar over the pin, wherein the lower and upper bores each include annular recesses adjacent openings to the lower and upper bores, wherein in step (c) the collar extends in each of the annular recesses.

17. The method according to claim 11, wherein in (c) the lower and the upper hinge components include threaded portions, wherein the at least one first and the at least one second movable members are threadably engagable with the threaded portions.

18. The machine according to claim 11, wherein in (a) the door has a generally “L” shaped cross section.

19. The method according to claim 11, further comprising mounting at least portions of a currency sheet dispenser within the chest.

20. A method comprising:

a) moving a door associated with a secure chest of a cash dispensing automated banking machine, wherein cash is stored within an interior area of the secure chest and wherein moving the door disposes the door away from an opening to the interior area, and wherein in moving the door the door rotates relative to a generally vertically extending hinge pin in supporting connection with the door;

b) moving the hinge pin such that angular orientation of the hinge pin relative to vertical is changed such that the position of the door is changed relative to the opening;

c) subsequent to (b) locking the door in the closed position relative to the opening through operation of at least one lock.

21. The method according to claim 20, further comprising:

d) prior to (c) moving the door in a generally vertical direction by operative engagement of a first adjusting member and the hinge pin.

22. The method according to claim 21, wherein in (b) the angular orientation of the hinge pin is moved by engagement with a second adjusting member.

23. The method according to claim 22, wherein in (b) the second adjusting member is moved in a generally horizontal direction and in (d) the first adjusting member is moved in a generally vertical direction.

24. The method according to claim 23, wherein in at least one of (b) and (d) the second and first adjusting members moves in the horizontal and vertical directions, respectively, responsive to rotational movement thereof.

25. The method according to clam 20, wherein the hinge pin extends in a bore in a hinge portion in supporting connection with at least one of the chest and the door, and wherein the diameter of the bore is greater than the diameter of the pin, and wherein each of the pin and the bore extend along a respective axis, and wherein in (b) the axis of the pin is moved angularly relative to the axis of the bore.

26. The method according to claim 25, wherein in (b) the hinge pin is moved through operative engagement of the hinge pin and at least one adjusting member, wherein the at least one adjusting member extends in the bore.

27. The method according to claim 26, wherein in (b) the hinge pin is moved responsive to generally horizontal movement of the at least one adjusting member.

* * * * *